(12) United States Patent
Müller et al.

(10) Patent No.: US 11,578,954 B2
(45) Date of Patent: Feb. 14, 2023

(54) IGNITER FOR A GAS GENERATOR AND METHOD FOR PRODUCING AN IGNITER

(71) Applicant: ZF Airbag Germany GmbH, Aschau a. Inn (DE)

(72) Inventors: Werner Müller, Mühldorf am Inn (DE); Rolf Mangold, Ruppertshofen (DE); Bernhard Mehnert, Ebersberg (DE)

(73) Assignee: ZF AIRBAG GERMANY GMBH, Aschau am Inn (DE)

( * ) Notice: Subject to any disclaimer, the term of this patent is extended or adjusted under 35 U.S.C. 154(b) by 354 days.

(21) Appl. No.: 16/649,396

(22) PCT Filed: Oct. 11, 2018

(86) PCT No.: PCT/EP2018/077730
§ 371 (c)(1),
(2) Date: Mar. 20, 2020

(87) PCT Pub. No.: WO2019/076725
PCT Pub. Date: Apr. 25, 2019

(65) Prior Publication Data
US 2021/0055084 A1    Feb. 25, 2021

(30) Foreign Application Priority Data

Oct. 18, 2017   (DE) .......................... 102017124292.9

(51) Int. Cl.
*F42B 3/107*   (2006.01)
*B60R 21/26*   (2011.01)
(Continued)

(52) U.S. Cl.
CPC .............. *F42B 3/107* (2013.01); *B60R 21/26* (2013.01); *F42B 3/103* (2013.01); *F42B 3/195* (2013.01); *B60R 2021/26029* (2013.01)

(58) Field of Classification Search
CPC .................................. F42B 3/103; F42B 3/107
See application file for complete search history.

(56) References Cited

U.S. PATENT DOCUMENTS

| | | | | |
|---|---|---|---|---|
| 4,566,892 A | * | 1/1986 | Ertel | ........................ C03C 27/02 |
| | | | | 65/59.24 |
| 5,243,492 A | * | 9/1993 | Marquit | .................... F42B 3/11 |
| | | | | 280/736 |

(Continued)

FOREIGN PATENT DOCUMENTS

| DE | 102007031690 | 1/2009 |
|---|---|---|
| DE | 102014219124 | 3/2016 |

(Continued)

*Primary Examiner* — Nicole T Verley
(74) *Attorney, Agent, or Firm* — Tarolli, Sundheim, Covell & Tummino LLP

(57) ABSTRACT

An igniter for a gas generator comprises a pole body (14) having at least one connection pin (16, 18), a retaining ring (20) and an insulation ring (22), wherein the insulation ring (22) spaces apart the at least one connection pin (16, 18) from the retaining ring (20) and electrically insulates it relative to the same. The retaining ring (20) consists of a metal and the insulation ring (22) consists of a plastic. In order to produce an igniter (10) for a gas generator at least one connection pin (16, 18), a retaining ring (20) and an insulation ring (22) are provided, the connection pin (16, 18), the insulation ring (22) and the retaining ring (20) are fitted inside one another in such a way that the connection pin (16, 18) is surrounded by the insulation ring (22) and the insulation ring (22) is surrounded by the retaining ring (20), and the retaining ring (20), the insulation ring (22) and the connection pin (16, 18) are compressed in a compression step in which at least the retaining ring (20) is deformed and the retaining ring (20), the insulation ring (22) and the connection pin (16, 18) are connected to one another securely and without play.

20 Claims, 20 Drawing Sheets

(51) Int. Cl.
*F42B 3/195* (2006.01)
*F42B 3/103* (2006.01)

(56) References Cited

U.S. PATENT DOCUMENTS

| | | | | |
|---|---|---|---|---|
| 5,404,263 | A * | 4/1995 | Graves | F42B 3/11 361/247 |
| 5,709,724 | A * | 1/1998 | Naugler | C03C 27/02 65/59.4 |
| 6,096,997 | A * | 8/2000 | Shirk | G01N 25/72 324/501 |
| 6,166,452 | A * | 12/2000 | Adams | F42B 3/198 361/247 |
| 6,274,252 | B1 * | 8/2001 | Naugler | C03C 27/02 403/30 |
| 6,341,562 | B1 * | 1/2002 | Brisighella | F42B 3/121 102/202 |
| 6,343,000 | B1 * | 1/2002 | Yokoyama | F42B 3/198 361/247 |
| 6,936,303 | B1 * | 8/2005 | Katsuda | F42B 3/12 29/595 |
| 8,276,514 | B2 * | 10/2012 | Fink | F42B 3/198 65/59.1 |
| 8,733,250 | B2 * | 5/2014 | Fink | F42B 3/103 102/202.7 |
| 8,978,557 | B2 * | 3/2015 | Hartl | F42B 3/103 102/202.7 |
| 9,423,218 | B2 * | 8/2016 | Hartl | F42B 3/103 |
| 10,209,041 | B2 * | 2/2019 | Dürschinger | B60R 21/26 |
| 10,684,102 | B2 * | 6/2020 | Hartl | B21K 1/761 |
| 11,205,610 | B2 * | 12/2021 | Hartl | H01R 4/02 |
| 2002/0174792 | A1 * | 11/2002 | Kubozuka | F42B 3/195 102/202.12 |
| 2005/0051435 | A1 * | 3/2005 | Forster | F42B 3/11 205/122 |
| 2005/0115434 | A1 * | 6/2005 | Avetisian | F42B 3/195 102/202.7 |
| 2005/0126415 | A1 * | 6/2005 | Takahara | F42B 3/103 102/202.7 |
| 2007/0187934 | A1 | 8/2007 | Fink | |
| 2008/0250963 | A1 * | 10/2008 | Fink | F42B 3/198 102/202.8 |
| 2010/0064923 | A1 * | 3/2010 | Fink | F42B 3/195 102/202.14 |
| 2010/0199872 | A1 * | 8/2010 | Fink | F42B 3/107 228/164 |
| 2012/0067240 | A1 * | 3/2012 | Hartl | F42B 3/198 102/202 |
| 2017/0363396 | A1 * | 12/2017 | Dürschinger | B60R 21/26 |

FOREIGN PATENT DOCUMENTS

EP   1808667 A2 *  7/2007   ............ F42B 3/103
WO   2014064497     5/2014

* cited by examiner

IGNITER FOR A GAS GENERATOR AND METHOD FOR PRODUCING AN IGNITER

RELATED APPLICATIONS

This application corresponds to PCT/EP2018/077730 filed Oct. 11, 2018, which claims the benefit of German Application No. 10 2017 124 292.9, filed Oct. 18, 2017, the subject matter of which are incorporated herein by reference in their entirety.

BACKGROUND OF THE INVENTION

The invention relates to an igniter for a gas generator and a method for producing an igniter.

Igniters are used in a gas generator to activate, especially ignite, a gas-generating material contained in the gas generator, for example a pyrotechnic means, by an electric pulse.

Gas generators are employed, for example, in vehicles where they provide filling gas for inflatable airbags, in the form of a micro gas generator provide kinetic energy for belt tensioners, or act as an actuator in a safety system such as e.g. a hood prop or a disconnector for a battery terminal.

Such igniter classically comprises a so-called pole body, also referred to as header, which includes two metallic electrically conducting connection pins and a holder for fixing the two connection pins. The two connection pins are separated from each other by an electrically insulating medium.

The two connection pins are connected to each other by an electrically conductive bridge wire which is in contact with a pyrotechnical ignition charge. The latter is accommodated in a cap and is encapsulated by the same. The pole body may be cased with a fastening portion with which the igniter can be mounted in the gas generator and which may also provide an electric connecting option for contacting the two connection pins by a plug from outside the gas generator.

It is generally known to form a holder of the pole body by a metallic ring and to provide an electric insulation by a glass frit which is initially present in liquid form in the metallic ring and in which at least one of the connection pins is fixed, especially in that the liquid frit is specifically cooled. Pole bodies of this type made from a metal ring including insulating bushings made from glass are also known as so-called GTMS headers (GTMS: Glass to Metal Seal). A known GTMS header is shown, for example, in U.S. Pat. No. 5,404,263. Manufacture is complicated and expensive.

As an alternative, it is known to surround two connection pins by injection-molding a plastic compound which then fixes the connection pins and additionally forms the fastening portion of the igniter. Although for said pole bodies substantially made from plastic the manufacturing process is inexpensive, it is complicated, however, to safeguard the desired mechanical strength and tightness.

SUMMARY OF THE INVENTION

It is the object of the invention to provide an igniter and a method for producing an igniter which overcome the drawbacks of the state of the art and which provide a mechanically stable and properly sealed igniter while the manufacture is less complicated.

This object is achieved by an igniter comprising the features of claim 1. An igniter for a gas generator has a pole body which comprises at least one connection pin, a retaining ring and an insulation ring, the insulation ring spacing the at least one connection pin apart from the retaining ring and electrically insulating the connection pin from the retaining ring, and the retaining ring consisting of a metal and the insulation ring consisting of a plastic. Due to this constructional design, the pole body can be produced initially separately in a low-cost method, wherein the use of the retaining ring made from metal enables the connection pin to be fed through to the outside of the igniter in a mechanically stable and airtight manner.

Preferably, the retaining ring and the insulation ring have substantially like dimensions along and, resp., in parallel to a longitudinal axis of the igniter so that the pole body forms a compact, geometrically simple component part.

Preferably, the pole body for the igniter for the gas generator may comprise at least one connection pin, a retaining ring made from a metal and an insulation ring made from a plastic, the insulation ring spacing the at least one connection pin apart from the retaining ring and insulating it from the retaining ring, and the insulation ring forming a separately prefabricated component part.

Such pole body is configured so that, in a top view, the at least one connection pin is surrounded by the insulation ring and the insulation ring is surrounded by the retaining ring. An electrical insulation as well as a sealing or packing between the retaining ring and the at least one connection pin is advantageously achieved solely by the insulation ring and the contact thereof with the retaining ring and the at least one connection pin.

Preferably, the igniter according to the invention may include a fastening portion made from plastic which is separate from the insulation ring and in which at least portions of the at least one connection pin are embedded. In this way, subsequent partial embedding of the pole body into the fastening portion can take place, especially by casting or injection-molding, resulting in high flexibility with low manufacturing costs. In order to improve the mechanical connection and the sealing action, preferably an outer peripheral surface of the insulation ring and an inner peripheral surface of the retaining ring have complementary textures which are engaging. The textures may form a type of simple labyrinth structure and may include undercuts with respect to the longitudinal axis of the pole body and, resp., the igniter.

Alternatively, or additionally, such complementary textures are also provided on an outer peripheral surface of the connection pin and on an inner peripheral surface of the insulation ring.

The insulation ring is advantageously toothed so-to-speak both with the retaining ring and with the connection pin via said textures so that, with respect to the longitudinal axis of the pole body and, resp., the igniter, it is not movable vis-à-vis the retaining ring and/or the connection pin.

The insulation ring has a through-opening, for example, through which an igniter-side end of the connection pin, especially of a first connection pin, extends, wherein preferably another connection pin, especially a second connection pin, is fastened to the retaining ring in an electrically conducting manner. Said igniter-side end of the connection pin substantially terminates in the plane formed by the surface of the insulation ring and the retaining ring, wherein especially the substantially coinciding areas or surfaces of the insulation ring and the retaining ring are meant which are provided to receive in a particular area an electrically conductive element, especially a bridge wire, which can activate a pyrotechnical ignition charge. The further connection pin, especially the second connection pin, may be fastened, preferably by welding or soldering, to the axial end face of the retaining ring which is opposed to the surface of the retaining ring that receives the bridge wire.

Usually, both connection pins consist of an electrically conductive material, conventionally of a metal, wherein they can be additionally coated at least partially with an external gold layer.

According to the present invention, it is also possible for the insulation ring to include two through-openings through which the igniter-side ends of two juxtaposed connection pins, especially a first and a second connection pin, extend.

In case that the insulation ring has only one through-opening through which the igniter-side end of the connection pin, especially of the first connection pin, extends, the electrically conductive element, especially a bridge wire having a resistivity, is fastened at the igniter-side end of said connection pin by one of its ends, wherein, in the case of current flow, the electrically conductive element can be strongly heated and the adjacent pyrotechnical ignition charge can ignite. The other end of said electrically conductive element is connected, especially welded, to the retaining ring in an electrically conducting manner. In this case, the further connection pin, especially the second connection pin, is fixed to the retaining ring in an electrically conducting manner.

In case that the insulation ring has two through-openings through which the igniter-side ends of the juxtaposed connection pins, especially those of the first and second connection pins, extend, the other end of said electrically conductive element is directly connected to the igniter-side end of the second connection pin in an electrically conducting manner so that in this case the two igniter-side ends of the two connection pins are directly connected to each other in an electrically conducting manner by the electrically conducting element.

In the present invention, the insulation ring must be configured in the radial direction to have only such a width that it develops a sufficient electrical insulating effect. It is possible that in the radial direction the retaining ring has a larger wall thickness than the insulation ring.

In a preferred embodiment, the insulation ring is a prefabricated component part that is inserted between the retaining ring and the connection pin. The insulation ring may be, for example, a component part produced separately per se, such as an injection-molded, cast or stamped part or a component part produced in a 3D printing process or by extrusion. This allows easy handling when mounting the igniter and, resp., the pole body, as the insulation ring, for example, can be provided as bulk material at a production line and then can be separated and fed without great effort.

According to another possible variant, the insulation ring is produced by injection-molding or casting a plastic material into a clearance between the retaining ring and the connection pin. Hence, the insulation ring is formed only by hardening a liquid plastic material, for example a two-component plastic material, after introducing the same between the retaining ring and the connection pin. Here it can be said that a casting or injection mold is formed by relative arrangement of the components of retaining ring and connection pin spaced apart from each other by forming a clearance between said component parts. Such clearance then can be filled with the plastic material directly at the assembly line of the igniter and, resp., the pole body, especially by casting, which offers the advantage of low or moderate temperature and/or pressure values as compared to injection-molding. Such a cast insulation ring requires short hardening times which can be even optimized by additional measures such as hardening by exposure to ultraviolet light when the plastic components are appropriately selected.

It is also possible that at least one connection pin is configured of two separate component parts, a first contact portion and a second contact portion, which are tightly connected, especially welded, soldered or glued, to each other to be electrically conducting. In particular, the first contact portion is surrounded or enclosed at least partially along its longitudinal extension by the or, resp., an insulation ring, with the second contact portion being substantially free from such enclosure. Consequently, an afore-described connection pin is not made from one single known elongate metal component part but comprises at least two component parts which are connected to each other to be electrically conducting and in their entirety form a connection pin. Preferably, the first and second contact portions are made from the same material, especially a metal known for use for a connection pin. Preferably, the first and second contact portions are configured as linear rod-shaped and, resp., substantially cylindrical wire elements extending longitudinally in the axial direction, wherein both contact portions include complementary connecting surfaces or connecting contours preferably in the area where they are connected to be electrically conducting so that they can be optimally connected, especially welded, soldered or glued, in this area. Advantageously, the first contact portion at each of its two opposite end faces has a planar surface which is formed substantially normal to the longitudinal axis of the first contact portion. The second contact portion advantageously has, only at an axial end, an end face including a planar surface which is complementary to the end face of the first contact portion to which it is connected so that it can be connected thereto in optimum alignment. The second contact portion has, at the axially opposed other end, a rounded or dome-shaped end, however, which is adapted to be coupled to a plug connector or plug for electrically connecting the igniter to a control device.

Summing up, the first contact portion is connected to the second contact portion in axial alignment so that thus a connecting pin is formed which comprises the two contact portions and substantially forms a continuous, longitudinally extending rod-shaped and, resp., substantially cylindrical shape or contour.

The above-stated object is also achieved by a method for producing an igniter for a gas generator by the steps indicated in claim 9. In this method for producing an igniter for a gas generator, the following steps are carried out:

Providing at least one connection pin, a retaining ring consisting of a metal and an insulation ring consisting of a plastic, Nesting the connection pin, the insulation ring and the retaining ring so that the connection pin is surrounded by the insulation ring and the insulation ring is surrounded by the retaining ring, and Compressing the retaining ring, the insulation ring and the connection pin in a compression step in which at least the retaining ring is deformed and the retaining ring, the insulation ring and the connection pin are connected to one other securely and free from play.

Each of the retaining ring, the insulation ring and the connection pin is a separately prefabricated part whose dimensions are not substantially changed even in the compression step. In the axial direction and the radial direction, especially the retaining ring and, where necessary, the insulation ring may vary in their dimensions by about 10% to 30%, for example. The connection pin preferably deforms only insignificantly during the compression step.

In the compression step, force acting in the axial direction may be applied to the retaining ring, the insulation ring and the connection pin. It is also possible, however, to additionally apply radial force. In general, in the compression step the retaining ring, the insulation ring and the connection pin are joined, especially pressed to one another. The compressing force may range e.g. from 5 N to 50 kN, wherein the compression step may comprise only one single compressing impact or else any number of compressing impacts.

In the compression step, especially a compressing die is moved to the igniter-side upper side of the retaining ring, the insulation ring and the connection pin with sufficient impact force to deform said component parts.

The retaining ring and the insulation ring can be put onto a support which in the compression step provides a counter-force to a compressing die moving in the axial direction which acts on the igniter-side surfaces of the retaining ring, the insulation ring and the igniter-side end of the connection pin.

The outer radius of the retaining ring preferably will not increase during the compression step. Preferably, a counter-holder surrounding the retaining ring is provided which prevents the retaining ring from evading in the radial direction and from increasing its outer radius.

When, as afore-described, the insulation ring includes two separate breakthroughs through each of which one end of a connection pin protrudes, in the same compression step both connection pins are connected to the insulation ring and to the retaining ring. The basic procedure is not changed.

The afore-mentioned object is also achieved by a method for producing an igniter for a gas generator with the steps listed in claim 11. In this method for producing an igniter for a gas generator, the following steps are carried out:

Providing at least a first contact portion, at least a second contact portion, a retaining ring consisting of a metal and an insulation ring consisting of a plastic, Nesting the first contact portion, the insulation ring and the retaining ring so that the first contact portion is surrounded by the insulation ring and the insulation ring is surrounded by the retaining ring, Compressing the retaining ring, the insulation ring and the first contact portion in a compression step in which at least the retaining ring is deformed and the retaining ring, the insulation ring and the first contact portion are connected to one another securely and free from play, wherein especially in the compression step force acting in the axial direction is applied to the retaining ring, the insulation ring and the first contact portion, and Connecting the second contact portion in an electrically conducting manner to the first contact portion, substantially in axial alignment, by welding, soldering or gluing, to form at least one connection pin from the first and second contact portions.

When, as afore-described, the insulation ring includes two separate breakthroughs through each of which a first contact portion protrudes, in the same compression step two first contact portions are connected to the insulation ring and to the retaining ring. After that, a respective second contact portion is connected in an electrically conducting manner to the respective first contact portion, substantially in axial alignment, by welding, soldering or gluing, to form a connection pin from the respective first and second contact portions so that the igniter includes a total of two connection pins. Accordingly, the basic procedure is not changed.

As afore-described, an outer peripheral surface of the insulation ring and an inner peripheral surface of the retaining ring preferably have complementary textures.

This applies mutatis mutandis to an outer peripheral surface of the connection pin in the area of the insulation ring and an inner peripheral surface of the insulation ring.

Before the compression step, a space between the insulation ring and the retaining ring is advantageously so large that the insulation ring and the retaining ring can be nested without being deformed, although the textures need not be free from undercuts. There may still be a play also between the insulation ring and the connection pin after nesting and before the compression step so that these component parts, too, can be nested without being deformed.

The shape, type and size of the textures between the insulation ring and the retaining ring and of those between the connection pin and the insulation ring may be selected to be equal or different.

The textures at the peripheral surfaces of the retaining ring and the connection pin can be introduced to the respective surfaces for example by material-abrading machining such as cutting, abrasion by laser beam, or chemically by etching or by forming procedures. It is also possible to use forming techniques and to design the texture directly when producing the respective component part. This is especially preferred when the insulation ring is fabricated from plastic material.

Any suitable geometry can be used as texture, such as corresponding projections and recesses in the form of burls and indentations having a round, oval, elongate or polygonal peripheral contour just as ribs and corresponding grooves which may extend merely in the axial direction, merely in the radial direction, optionally obliquely to said directions or in corrugated shape. Also, threaded shapes and other spirally extending line structures may be utilized. The surface of the textures may be selected to be rounded, straight or angular.

In the compression step, the textures of the insulation ring and the retaining ring are then fitted inside one another preferably free from gaps, especially in a moisture-tight and gastight or, resp., airtight manner, so that, after the compression step, the connection pin, the insulation ring and the retaining ring are directly connected to one another securely, without gaps and play and, where possible, in a gastight and airtight manner.

It is also imaginable to design the insulation ring which consists of plastic and thus can be deformed more easily at first without textures or with textures that are flatter in the radial direction so that the textures form at the insulation ring or are designed in their final dimensions as late as during the compression step.

In general, the retaining ring and the connection pin can be produced, for example, by drawing, deep-drawing, stamping, reforming, sintering, metal injection molding, electro-chemical separation processes or in 3D printing.

It has turned out to be of advantage when, before the compression step, an axial length of the retaining ring is larger than an axial length of the insulation ring, wherein especially the retaining ring and the insulation ring are axially aligned relative to each other such that the igniter-side upper side of the retaining ring protrudes from the igniter-side upper side of the insulation ring. Thus, the correspondingly resulting material excess of the material of the retaining ring can be used to displace the inner peripheral surface of the retaining ring inwardly in the radial direction so that the textures of the retaining ring and the insulation ring will engage. Preferably, the material excess is chosen to be so high that also a deformation of the insulation ring radially inwardly is effectuated which brings the textures at the inner peripheral surface of the insulation ring into engagement with the textures at the outer peripheral surface of the connection pin.

The wall thickness of the insulation ring may range especially from 1 mm to 15 mm. The axial length of the insulation ring may range especially from about 1 mm to 10 mm.

The inner diameter of the retaining ring may range e.g. from about 1 mm to 25 mm, while the outer diameter of the retaining ring may range from 1.5 mm to 50 mm. The value of the wall thickness can be imagined to range from 1 mm to 25 mm. The height corresponds especially to that of the insulation ring and may be selected to be from about 1 mm to 10 mm, wherein an initial projection of the height of the retaining ring, which is thus formed before a first compression step, may amount to about 10% to 20% as compared to the height of the insulation ring.

After the compression step or after completion of plural compression steps, in general the igniter-side upper side of the retaining ring, the insulation ring and the connection pin forms a substantially even and smooth surface.

However, it is possible in the compression step to produce a raised structure on said igniter-side upper side of the pole body and especially on the surface of the retaining ring, the insulation ring and/or the connection pin and, resp., the first contact portion.

The raised structure may especially be a web extending between the connection pin and the retaining ring, or, when two connection pins passing through the insulation ring are provided, a web in the surface of the insulation ring between the two connection pins.

Of preference, in case merely one single connection pin is present inside the insulation ring, another connection pin is fastened, especially by welding or soldering, to the retaining ring in an electrically conducting manner.

In case the insulation ring has only one through-opening through which one single connection pin extends, an electrically conductive element, especially a bridge wire, is arranged, especially welded or soldered, in an electrically conducting manner between the connection pin and the retaining ring, as afore-described. Instead of a bridge wire, also e.g. a conductor plate, a chip element, a thick-film element or a thin-film element may be used, as a matter of course, as is known from prior art.

In case the insulation ring includes two through-openings through which two juxtaposed connection pins extend, the electrically conductive element, particularly the bridge wire, is arranged between the two connection pins.

If a raised structure is provided, the electrically conductive element preferably rests on the raised structure, wherein preferably in a top view the width of the raised structure is by far larger than the width of the electrically conductive element such that a projection of the raised structure will form along the longitudinal extension of the electrically conductive element so that a safe and, resp., sufficiently wide support of the electrically conducting element on the raised structure is ensured.

As already mentioned before, the compression step may comprise plural, especially up to several hundreds of compressing impacts. In this way, the surface finish can be improved and the roughness of the surface can be reduced. Preferably, said multiple compression steps are carried out before mounting the electrically conductive element and before mounting another connection pin to the retaining ring, if merely one single connection pin is present within the insulation ring.

A multiple compressing impact may be carried out only in the area of the raised structure, where appropriate.

It is also imaginable to produce the raised structure only in such subsequent compressing impact following one or more first compressing impacts during which the connection pin, the insulation ring and the retaining ring have been interconnected.

The pole body completely mounted with the electrically conductive element is connected to a first cap filled with a compressed pyrotechnical igniter charge. The first cap may preferably be made from metal, for example steel, wherein it may be filled with one or more different layers of a compressed pyrotechnical igniter charge. The afore-described mounted pole body can be inserted or moderately pressed into the open end of such pre-filled cap, wherein preferably a circumferential sidewall of the open end of the first cap encloses the retaining ring of the pole body, especially in a press-fit mode, and is fastened, especially welded, radially circumferentially to the retaining ring. This ensures especially a hermetic sealing and a certain mechanical bias or tamping of the pyrotechnical igniter charge. Accordingly, proper close contact of the electrically conductive element with the pyrotechnical igniter charge is required. Placing the electrically conductive element on the raised structure may ensure increased contact force and thus a proper contact.

An igniter prefabricated in this way comprising the afore-described first metal cap can be used directly for being mounted in a gas generator housing, especially in an outer housing of a gas generator by the latter being tightly mounted, especially welded, into such outer housing. Of preference, such igniter can be fitted with an outer area of the first cap into a holding fixture of a gas pressure tank made from metal in which a gas or a gas mixture is stored at a pressure of 200 to 600 bar already in the idle condition, viz. in the condition which is not released as intended, and can be welded to said holding fixture in a gastight manner.

Further, it is also possible, however, that such a prefabricated igniter includes, in addition to the first metal cap, another cap, especially a second outer cap preferably made from an electrically insulating material such as plastic, Such second cap can be attached or, resp., pressed directly onto the first cap and thus enclose the outer contour of the first cap substantially completely so as to form a subarea of the outer contour of such prefabricated igniter. In particular, such second cap has the function to electrically insulate the thus prefabricated igniter to the outside.

In general, by the term cap relating to the first and second caps a component part having a substantially cylindrical sidewall is meant, the sidewall being axially closed by a cap bottom and an opening of the cap being axially opposed to the cap bottom.

After completing the pole body by the afore-described method, after mounting the bridge wire to the pole body and after attaching the first and second caps, preferably a fastening portion made from plastic is injection-molded or cast around the tightly interconnected subassembly consisting of two connection pins, the insulation ring and the retaining ring, at least portions of the connection pins being embedded in the fastening portion. The openings and, resp., the edges of the openings of both caps, especially also a subarea of the axial sidewall of the second cap, starting from the opening thereof to the cap bottom thereof, can equally be embedded into the fastening portion, where necessary.

The second connection pin either can be passed also through a through-opening, especially a second through-opening, within the insulation ring and, in the compression step, can be connected to the retaining ring by means of the insulation ring, or it can be welded to the retaining ring after the compression step.

The fastening portion forms, as already afore-described, a fastener for fixing the igniter, on the one hand, in a separate igniter support which can be fastened in the gas generator or, on the other hand, directly in the gas generator, and additionally seals the pole body from moisture.

Even if, in an alternative technique according to the invention, as afore-mentioned, the insulation ring is produced by injection-molding or casting a plastic material into the gap between the connection pin and the retaining ring, preferably surrounding by casting or injection-molding the fastening portion is always carried out in a separate working step. Accordingly, different plastic material can be used for the insulation ring and for the fastening portion.

It is also imaginable to produce the fastening portion so that the pole body is connected to the gas generator by the casting or injection-molding process, i.e. to so-to-speak cast or injection-mold the fastening portion into the gas generator.

BRIEF DESCRIPTION OF THE DRAWINGS

Hereinafter, the invention will be described in detail by way of several example embodiments with reference to the attached drawings, wherein.

DESCRIPTION

Figure 1A:
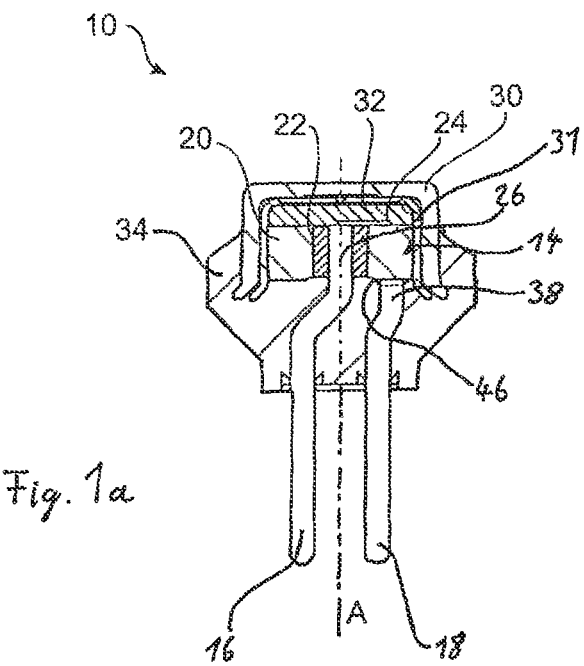
FIG. 1a shows an igniter according to the invention for a gas generator in a schematic sectional view being produced in accordance with a method according to the invention.

FIG. 1a illustrates an igniter 10 according to the invention comprising a pole body 14 which in turn is composed of two electrically conductive connection pins 18, 18, especially of a first connection pin 16 and a second connection pin 18, and a retaining ring 20 consisting of a metal as well as an insulation ring 22 consisting of a plastic (in detail see FIGS. 8 to 34). The pole body 14 has an igniter-side upper side 28

(see e.g. FIG. 4), wherein said upper side 28 at the same time can also be understood to be a respective igniter-side upper side 28 of the retaining ring 20, igniter-side upper side 28 of the insulation ring 22 and igniter-side upper side 28 of an igniter-side end 26 of the connection pin 16. In other words, the igniter-side upper side 28 of the pole body 14 can also be understood to be an aggregation of the individual respective igniter-side upper sides formed there, viz. that of the retaining ring 20, of the insulation ring 22 and of the igniter-side end 26 of the connection pin 16. To simplify matters, in the following for the term "igniter-side upper side" sometimes only the abbreviated term "upper side" will be used. In the example as shown in FIG. 1a, also an electrically conductive element 24 having a resistivity, which is especially in the form of a bridge wire, is considered to belong to the pole body 14, wherein the electrically conductive element 24 extends between the upper (in the FIGS.) igniter-side end 26 of the connection pin 16 and the igniter-side upper side 28 of the retaining ring 20.

The igniter-side end of the pole body 14 and especially the entire upper side 28 of the retaining ring 20, the insulation ring 22 and the end 26 of the connection pin 16 are completely covered by a first cap 31 preferably made from metal which in its interior accommodates an ignition charge 32, especially a pyrotechnical ignition charge. The ignition charge 32 is in direct contact with the electrically conductive element 24 and with the upper side 28 of the pole body 14.

The electrically conductive element 24 is for example a bridge wire, as conventionally known, but it might as well be a different component part that can be heated by current flow between the two connection pins 16, 18 so strongly that it can ignite the ignition charge 32.

Via the first cap 31, in direct contact with the same a second cap 30 preferably made from an electrically non-conducting material such as plastic is attached or press-fitted. The second cap 30 encloses the outer contour of the first cap 31 substantially completely and thus also forms an outer cap.

Moreover, the igniter 10 further includes a fastening portion 34 which in this case is made from plastic and which surrounds a central portion of the two connection pins 16, 18 so that portions thereof are embedded in direct contact with the plastic material of the fastening portion 34 into the latter and are also fixed by the latter. Likewise, a peripheral edge of the second cap 30, especially a free edge thereof, and a subarea of an adjoining axial sidewall of the second cap 30 are completely embedded in the material of the fastening portion 34 and are sealed from the environment by the latter.

The retaining ring 20, the insulation ring 22, the igniter-side end 26 of the connection pin 16 as well as the electrically conductive element 24 and the ignition charge 32 are completely surrounded here by the second cap 30 and the fastening portion 34 and are hermetically sealed from the environment, especially in an airtight and, resp., gastight manner.

In this example, an igniter-side end 38 of the second connection pin 18 is passed only to the igniter-remote side of the retaining ring 20 and there is connected, e.g. welded or soldered, to the latter in an electrically conductive manner. The "igniter-remote side" of the retaining ring 20 is meant to be the side of the retaining ring 20 which is longitudinally opposed in the axial direction to the igniter-side upper side 28 of the retaining ring 20 on which the electrically conductive element 24 is arranged. Concretely speaking, the igniter-remote side of the retaining ring 20 is a lower side 46 of the retaining ring 20.

The insulation ring 22 consists of electrically non-conductive plastic material and separates the igniter-side end 26 of the connection pin 16 spatially from the metallic retaining ring 20 and insulates said components also electrically from each other. The only electric contact between the retaining ring 20 and the connection pin 16 is made via the electrically conductive element 24 in a non-activated condition of the igniter 10 in which the electrically conductive element 24 is (not yet) activated, as illustrated in FIG. 1a.

The retaining ring 20 surrounds the insulation ring 22 in a radially circumferential manner, wherein in the radial direction r the two component parts are directly adjacent to each other and, resp., contact each other over their entire respective periphery. In other words, the retaining ring 20 is adjacent, with its radially circumferential area with respect to its inner diameter, to the radially circumferential area of the insulation ring 22 with respect to the outer diameter thereof. Furthermore, the insulation ring 22 surrounds the end 26 of the connection pin 16 in a radially circumferential manner. These component parts, too, are directly adjacent to and contact each other in the radial direction r over their entire respective periphery. In other words, the insulation ring 22 is adjacent, with its radially circumferential area with respect to its inner diameter, to the radially circumferential area of the connection pin 16 with respect to the outer diameter thereof.

The fastening portion 34 in this case forms a component part especially separate from the insulation ring 22 which is also manufactured in a separate working step, as will be described further below.

Figure 1B:
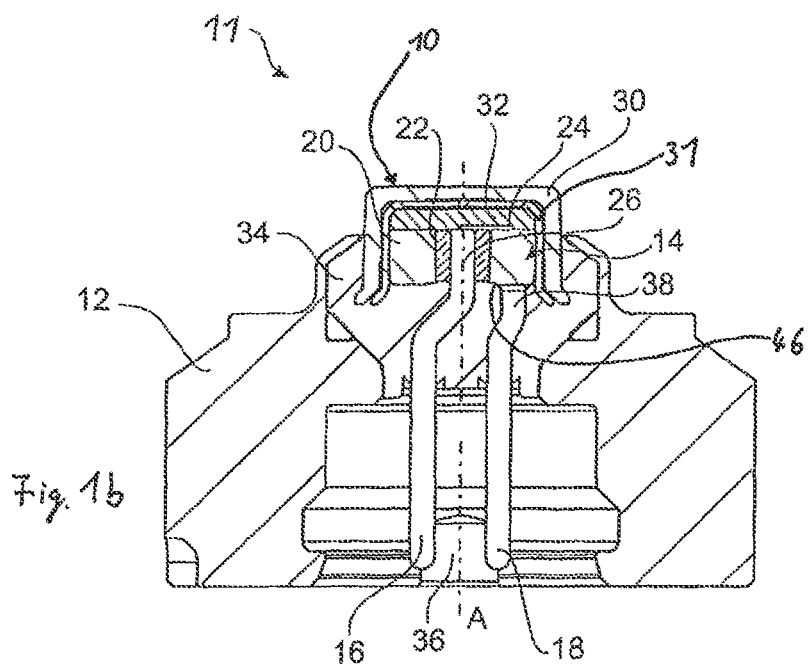
FIG. 1b shows a subassembly 11 comprising the igniter 10 according to the invention from FIG. 1a when being inserted in a component part of an outer housing of a gas generator being produced in accordance with a method according to the invention.

FIG. 1b illustrates a subassembly 11 comprising the igniter 10 according to the invention, as shown in FIG. 1a, being inserted in a housing 12 of a gas generator not shown in detail. The illustrated housing 12 may also be understood to be a part of a housing of such gas generator or, resp., at least as a subarea of such housing. In particular, the shown housing 12 can constitute a subarea of an outer housing of such gas generator, with the housing 12 being preferably made from metal and the igniter 10 being tightly held especially by a beaded or bent collar-type extension of the housing 12 within the same. The housing 12 itself may also be inserted into another housing part which is not shown, for example into an, especially tubular, outer housing of such a gas generator, and may especially be welded to an end section of such a gas generator.

Alternatively to this, it is also possible to connect only the pole body 14 of the igniter 10 by means of the fastening portion 34 directly to the housing 12 of the gas generator by fastening the pole body 14 to or into the housing 12, especially into an end-side opening thereof, by means of plastic coating. Accordingly, the fastening portion 34 then constitutes a subarea of such plastic coating or plastic injection-molding of the pole body 14 into the housing 12. Accordingly, an afore-described beaded or bent collar-type extension of the housing 12 can be omitted, as the pole body 14 can be held merely by injection-molding or coating the fastening portion 34 into the housing 12.

Instead of the gas generator, also a so-called micro gas generator actuator may be understood in this case which is used for example for lifting a hood of a vehicle for a pedestrian safety system, wherein the shown housing 12 then constitutes a corresponding housing or housing component of such micro gas generator or actuator.

In the housing 12 of the gas generator there is formed a plug holder 36 via which the free ends of the two connection pins 16, 18 can be electrically contacted so as to activate, viz. to release, the igniter 10 in such a way that an ignition of the ignition charge 32 and an intended application of the gas generator can be carried out.

In FIGS. 2 to 5, a production method according to the invention for the igniter 10 shown in FIG. 1a is illustrated.

In this case, the retaining ring 20, the insulation ring 22 as well as the connection pin 16, especially the first connection pin 16, are separate prefabricated component parts each of which can be produced per se and independently of each other and can be made available for the production method of the igniter 10 according to the invention.

The retaining ring 20 is ring-shaped with a through-opening 39a. The outer periphery of the retaining ring 20 is circular in this case, but it may also exhibit any other contour.

The insulation ring 22 in this case is equally ring-shaped with one single through-opening 39b.

In general, a wall thickness of the insulation ring 22 in the radial direction r can be selected to be smaller than, equal to or larger than that of the retaining ring 20 so that the wall thickness of the insulation ring 22 can be designed independently of the wall thickness of the retaining ring.

Figure 2:
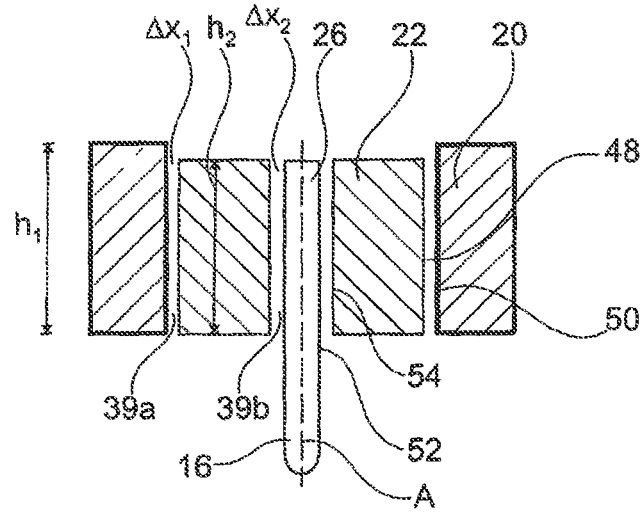
FIGS. 2 to 4 show steps of producing an igniter according to the invention in accordance with a method according to the invention as set forth in a first embodiment.

The three components of retaining ring 20, insulation ring 22 and connection pin 16 are fitted inside one another, as shown in FIG. 2, so that the insulation ring 22 is arranged inside the through-opening 39a of the retaining ring 20 and the end 26 of the connection pin 16 is arranged inside the through-opening 39b. The retaining ring 20 and the insulation ring 22 in this example are concentric to the igniter-side end 26 of the connection pin 16 or, resp., concentric with respect to the first connection pin 16. A longitudinal axis A of the end 26 of the connection pin 16, which may also be understood as a longitudinal axis A of the first connection pin 16, coincides with a longitudinal axis A of the entire igniter 10 or is aligned in parallel thereto, as is also evident from FIG. 1a and FIG. 1b.

Along this longitudinal axis A and, resp., in parallel thereto, the longitudinal extension $h_1$ of the retaining ring 20 is chosen to be somewhat larger than the longitudinal extension $h_2$ of the insulation ring 22 so that a difference in the axial length and, resp., a projection of the retaining ring 20 is resulting which may amount to about 1 to 15%, relating to the longitudinal extension $h_2$ of the insulation ring 22. The three components of retaining ring 20, insulation ring 22 and connection pin 16 are arranged relative to each other, especially axially to each other, such that the projection of the retaining ring 20 is formed on the side of the igniter-side end 26 of the connection pin 16 and, resp., that the igniter-side upper side 28 of the retaining ring 20 protrudes from the igniter-side upper side 28 of the insulation ring 22 and that of the connection pin 16 against an axial direction a. The axial direction a is substantially parallel to the longitudinal axis A of the connection pin 16 and, resp., to the longitudinal axis A of the entire igniter 10 and faces toward the end of the connection pin 16 which is axially opposed to the igniter-side end 26 of the connection pin 16.

The retaining ring 20, the insulation ring 22 and the igniter-side end 26 of the connection pin 16 are fitted inside one another while having so much play or, resp., space $\Delta x_1$, $\Delta x_2$ that no deformation will occur with any of said components (see e.g. FIG. 2). In other words, said three components of retaining ring 20, insulation ring 22 and connection pin 16 are positioned relative to one another at sufficient spaces $\Delta x_1$, $\Delta x_2$ extending in the radial direction so that nesting of the three components are enabled to be fitted inside one another without being deformed, Yet in other words, a clearance fit can be formed between the three components relative to one another when they are provided and, resp., fitted inside one another.

Figure 3:
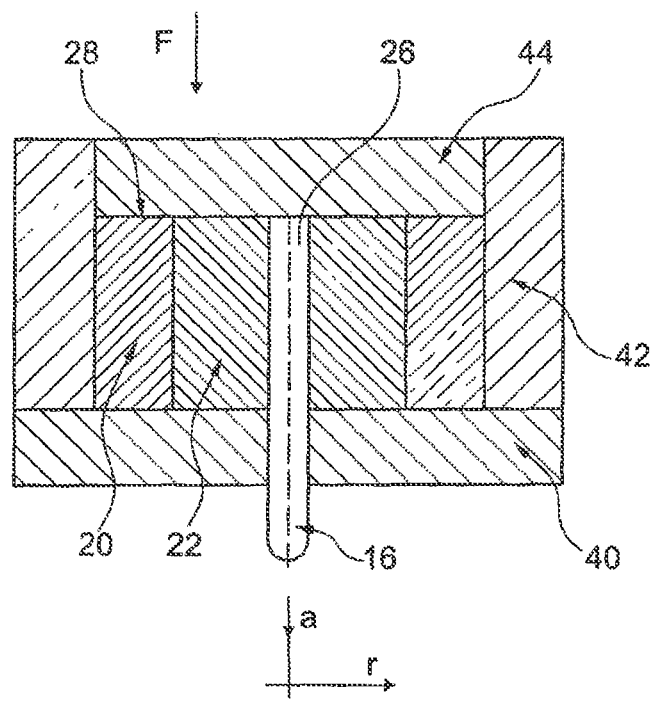

As illustrated in FIG. 3, the subassembly shown in FIG. 2 is put onto a support 40 having an opening through which the connection pin 16 protrudes, with the connection pin 16 being fixed at its position so that its igniter-side upper side 28 is level with the igniter-side upper side 28 of the insulation ring 22. A counter-holder 42 encloses the retaining ring 20 in the peripheral direction and prevents the retaining ring 20 from evading or from being movable or from pinching material in the radial direction r. By a compressing die 44 movable along the axial direction a, now a force F acting in the axial direction a is applied to the retaining ring 20, the insulation ring 22 as well as the end 26 of the connection pin 16. This can be carried out in one single pulse or any number of individual pulses or compression steps with the afore-described application of force. By repeated application of force, the igniter-side upper side 28 of the retaining ring 20, of the insulation ring 22 and of the igniter-side end 26 of the connection pin 16, viz. the entire igniter-side upper side 28 of the pole body, can be smoothed more strongly and thus a higher surface finish can be obtained.

In this example, the force F is applied in pulses or suddenly over a short period of time. Accordingly, high application of force can be effectuated over a short period of time. The force F may amount up to about 50 kN but may also be selected to be less, such as up to about 5 N, The amount of the force F is especially dependent on the dimensions of the igniter 10 and, resp., the components thereof.

Such application of force and, resp., such compression step helps to achieve joining, especially pressing, the retaining ring 20, the insulation ring 22 and the connection pin 16 together.

The afore-described application of force causes the material of the retaining ring 20 to flow radially inwardly and, resp., to be pinched or urged in the radial direction r and, accordingly, to displace also the insulation ring 22 radially inwardly in the direction of the connection pin 16. Accordingly, the clearances (see FIG. 2) between the insulation ring 22 and the retaining ring 20 and between the insulation ring 22 and the connection pin 16 are completely closed. In particular, the material of the retaining ring 20 projecting over the dimension $h_2$ fills at least a subarea of the clearance between the insulation ring 22 and the retaining ring 20. Both the diameter of the through-opening 39a of the retaining ring 20 and the diameter of the through-opening 39b of the insulation ring 22 are reduced in this compression step and, resp., are successively reduced in respective several compression steps.

It would also be possible to apply, in the afore-described compression step or optionally or selectively in subsequent repeated compression steps, not only a merely axially acting force F, but also to additionally apply, for example, a radially inwardly acting force which is directed substantially perpendicularly to the outer wall of the counter-holder 42 from radially outside to radially inside.

Upon completing the compression step or, resp., several compression steps, the igniter-side end 26 of the connection pin 16, the insulating pin 22 and the retaining ring 20 are connected to one another securely and free from play. The connection between the individual component parts is especially moisture-tight and airtight or, resp., gastight.

Figure 4:
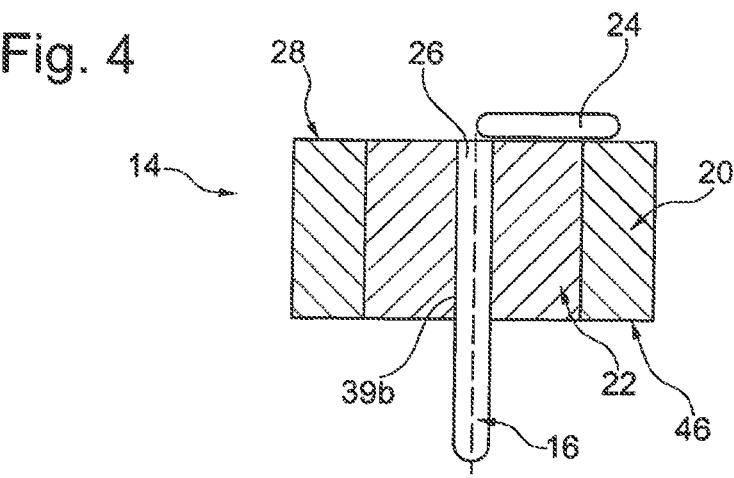

FIG. 4 illustrates the tightly connected subassembly of the retaining ring 20, the insulation ring 22 and the connection pin 16.

As is evident from FIG. 4, in another working step now the electrically conductive element 24 is arranged on the upper side 28 of the pole body 14 and is connected, especially welded and soldered, in a secure and electrically conductive manner to the connection pin and to the retaining ring 20.

Moreover, the igniter-side end 38 of the second connection pin 18 can be welded to the lower side 46 of the retaining ring 20. This is not explicitly shown in FIG. 4, but by the reference numeral 46 merely a possible point is indicated there on the lower side 46 of the retaining ring on which the second connection pin 18 can be appropriately mounted. In FIG. 1a, a possible embodiment of the igniter according to the invention comprising a corresponding second connection pin 18 is shown being fastened to the lower side 46 of the retaining ring 20.

In the course of the compression step or, resp., the plural repeated compression steps, the roughness of the upper side 28 of the pole body 14 is reduced as far as possible so that a surface exhibiting high surface finish is formed. The upper side 28 can form a single smooth plane.

Figure 4A:
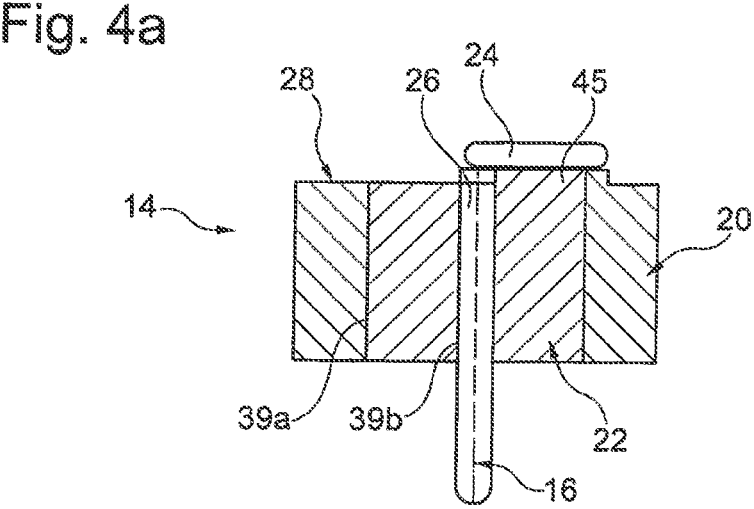
FIG. 4a shows a sectional view of an igniter according to the invention produced in accordance with a method according to the invention as set forth in a variant.
Figure 5:
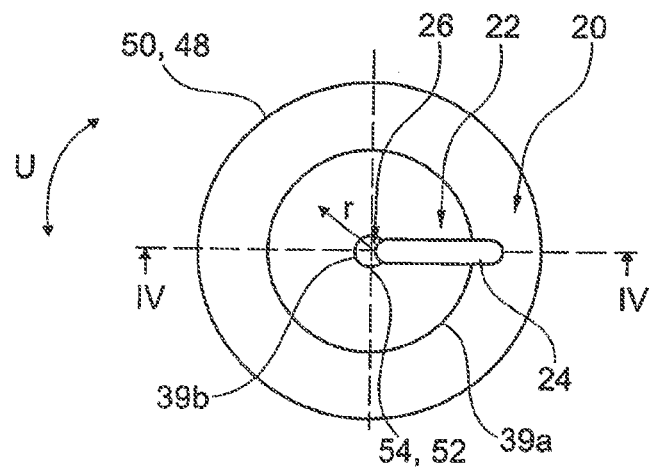
FIG. 5 shows a schematic top view onto an igniter-side upper side of a completed pole body of the igniter according to the invention produced in accordance with the method according to the invention.

However, it is also possible to provide the upper side 28 with a raised structure 45, wherein the raised structure 45 is equally produced in the compression step or, resp., by plural successively taken compression steps, especially by a compressing die 44 adapted to the contour of the raised structure 45. Such raised structure 45 is shown in FIG. 4a.

It would also be possible to use a second compressing die 44 which acts on the upper side 28 only in the area of the raised structure 45 to produce an especially little roughness there. The raised structure 45 is a web, for example, which extends exclusively beneath the conductive element 24 from the igniter-side end 26 of the connection pin 16 to the retaining ring 20 and on which the electrically conductive element 24 rests.

Figure 6:
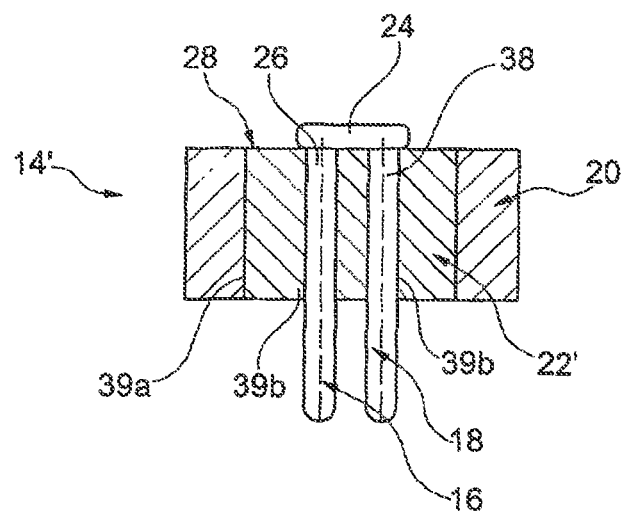
FIG. 6 shows a completed pole body of an igniter according to the invention in a schematic sectional view as set forth in a second embodiment produced in accordance with a method according to the invention.
Figure 7:
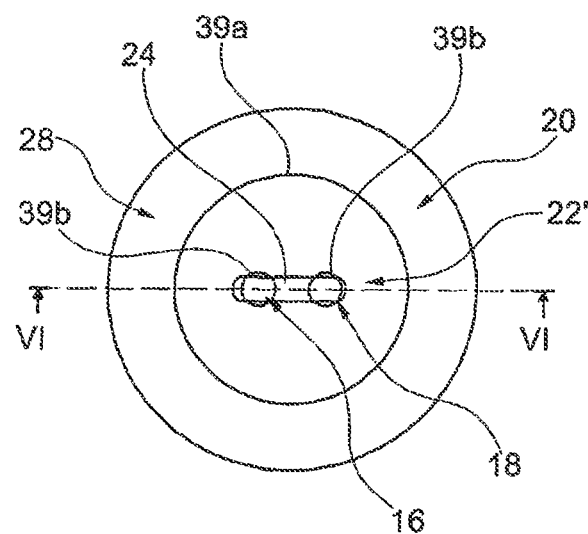
FIG. 7 shows the pole body from FIG. 6 in a schematic top view onto the igniter-side upper side thereof.
Figure 8:
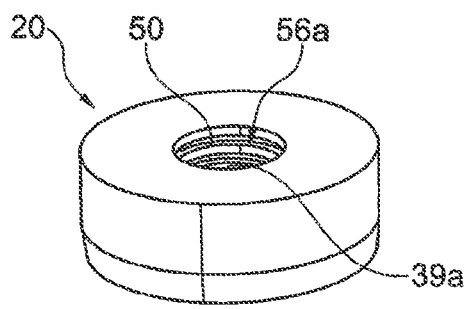
FIG. 8 shows a retaining ring, an insulation ring as well as an upper igniter-side end of a connection pin of a pole body of an igniter according to the invention in a schematic perspective view before manufacturing of the igniter is started in a method according to the invention, comprising a texture according to a first variant.
Figure 8:
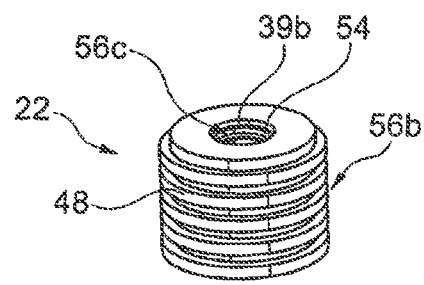
Figure 8:
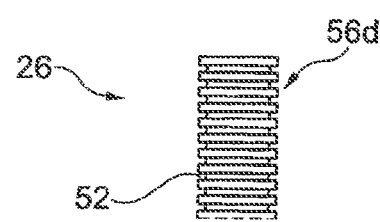
Figure 9:
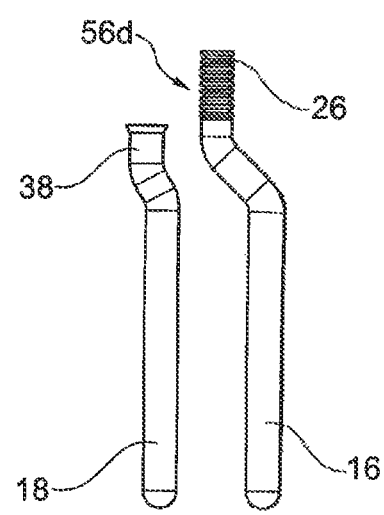
FIG. 9 shows the connection pins of the pole body of the igniter according to the invention as set forth in FIG. 8.

The FIGS. 6 and 7 illustrate a second embodiment of a pole body 14' of the igniter 10.

In contrast to the just described embodiment, there the insulation ring 22' includes two through-openings 39b through which the igniter-side end 26 of the first connection pin 16 as well as the igniter-side end 38 of the second connection pin 18 protrudes. In this case, the second connection pin 18 is not fastened to the lower side 46 of the retaining ring but extends to the upper side 28 of the pole body 14' and, resp., of the insulation ring 22'. The electrically conductive element 24 in this case connects the igniter-side upper sides of the two connection pins 16, 18 on the upper side 28 of the pole body 14' to each other.

The retaining ring 20 can be designed identically with the first embodiment. It is possible to somewhat increase the diameter of the retaining ring 20 and of the insulation ring 22' as compared to the first embodiment.

In this case, too, a raised structure can be provided beneath the electrically conductive element 24.

The contour of an outer peripheral surface 48 (see FIG. 2) of the insulation ring 22 (and, analogously, of the insulation ring 22') as to its shape corresponds substantially to the contour of an inner peripheral surface 50 of the through-opening 39a of the retaining ring 20. Equally, a contour of an outer peripheral surface 52 of the igniter-side end 26 of the connection pin 16 as to its shape corresponds substantially to the contour of an inner peripheral surface 54 of the respective through-opening 39b of the insulation ring 22, 22'. In a top view, the contours may be substantially circular, but they may also take different shapes.

The surfaces or peripheral surfaces 48, 50, 52, 54 are provided with textures 56a, 56b, 56c, 56d according to the variants shown in FIGS. 8 to 45.

Accordingly, the directly adjacent surfaces, i.e. the outer peripheral surface 48 of the insulation ring 22 and the inner peripheral surface 50 of the retaining ring 20 as well as the outer peripheral surface 52 of the connection pin 16 and the inner peripheral surface 54 of the insulation ring 22, have respective complementary textures 56b, 56a and, resp., 56d, 56c which are configured to be capable of engaging in the radial direction r.

The textures 56a, 56b between the retaining ring 20 and the insulation ring 22 may take the same shape as the textures 56c, 56d between the insulation ring 22 and the connection pin 16, but also different shapes may be selected for said textures.

During the compression step, the textures 56a, 56b and 56c, 56d of all textured surfaces 48, 50, 52, 54 are radially fitted inside one another so that the respective textures engage especially free from play. In this way, the retaining ring 20, the insulation ring 22 and the first connection pin 16 are connected to each other undisplaceably and tightly in the axial direction a and in the peripheral direction, i.e. radially circumferentially.

Figure 10:
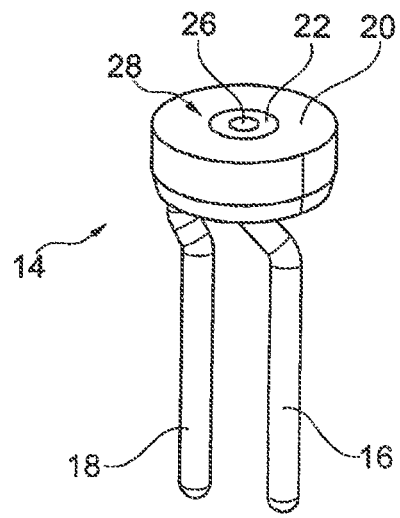
FIG. 10 shows the pole body completed out of the components of FIGS. 8 and 9, wherein the connection pin, the insulation ring and the retaining ring are bearing a first texture.

FIG. 10 illustrates the completed pole body 14 after the compression step and after welding the second connection pin 18 to the retaining ring 20. In the finished pole body 14 the textures 56a, 56b, 56c, 56d are not visible from outside.

Figure 11:
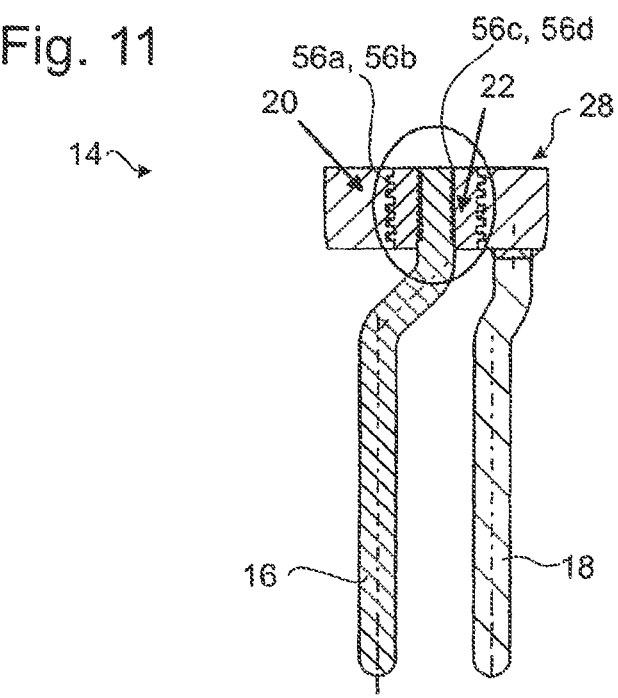
FIGS. 11 to 13 show different schematic sectional views of the pole body from FIG. 10.
Figure 13:
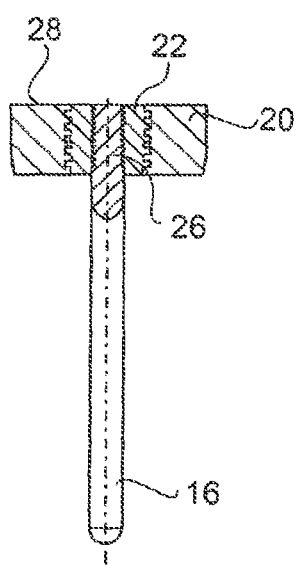
Figure 12:
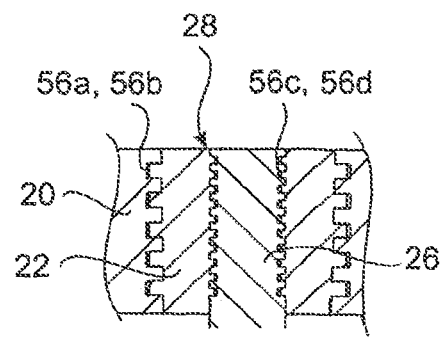

The FIGS. 11 to 13 illustrate in which way the textures 56a, 56b, 56c, 56d engage after the compression step in the finished pole body 14.

In this example, all textures 56a, 56b, 56c, 56d consist of ribs which extend in the peripheral direction or, resp., radially circumferentially, are evenly spaced apart from one another in the axial direction a and project in the radial direction r. In the case of opposed surfaces 48, 50 and 52, 54, respective ribs encounter grooves formed between the ribs, of course.

All textures 56a, 56b, 56c, 56d here extend substantially over the entire axial length of the respective surface 48, 50, 52, 54.

Figure 14:
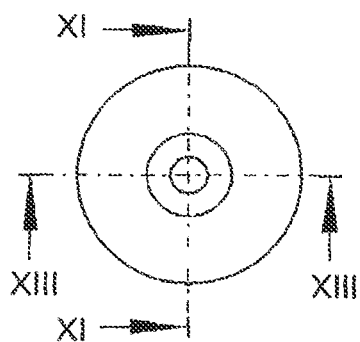
FIG. 14 shows a schematic top view onto the igniter-side upper side of the pole body from FIG. 10.
Figure 15:
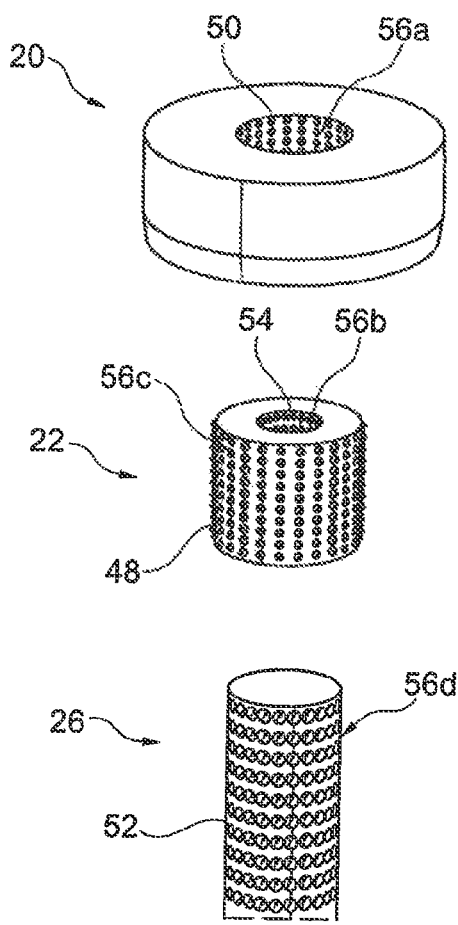
FIG. 15 shows a retaining ring, an insulation ring and an upper igniter-side end of a connection pin of a pole body of an igniter according to the invention before manufacturing of the igniter is started in a method according to the invention, in a schematic perspective view, comprising a texture according to a second variant.
Figure 16:
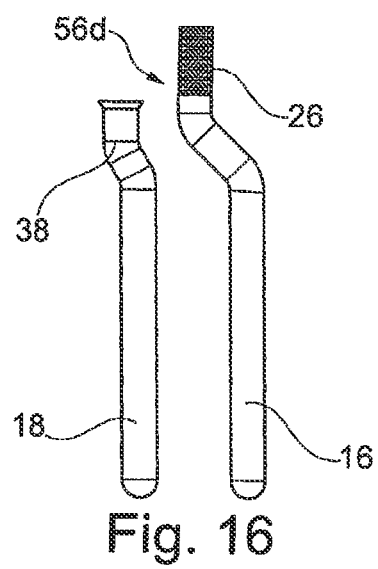
FIG. 16 shows the two connection pins of the pole body according to FIG. 15.
Figure 17:
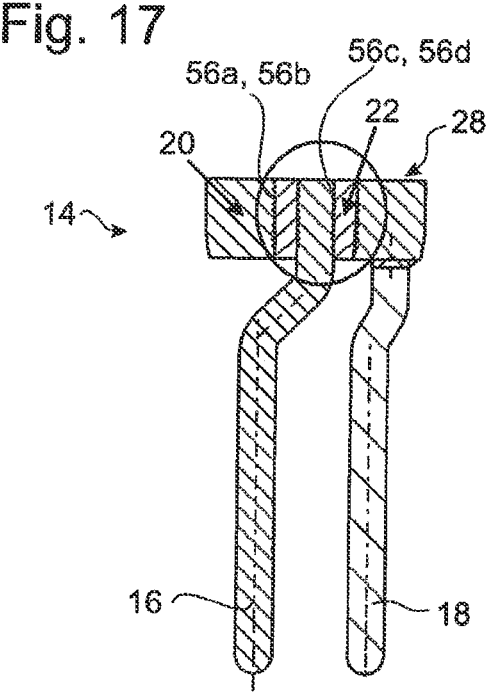
FIGS. 17 to 19 show different schematic sectional views of the pole body manufactured out of the components of the FIGS. 15 and 15.
Figure 18:
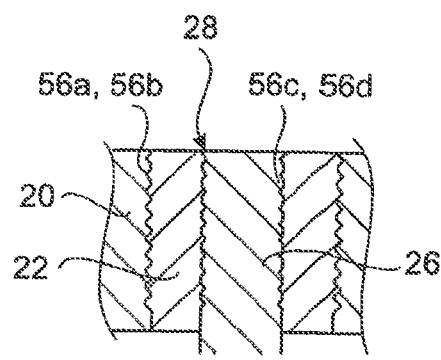
Figure 19:
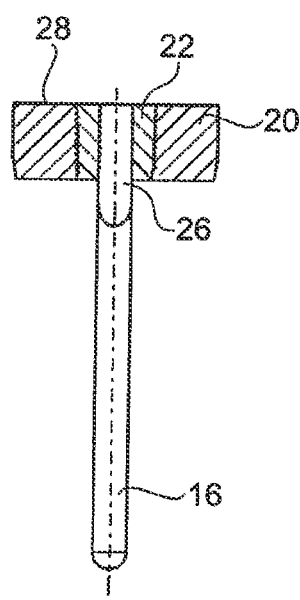
Figure 20:
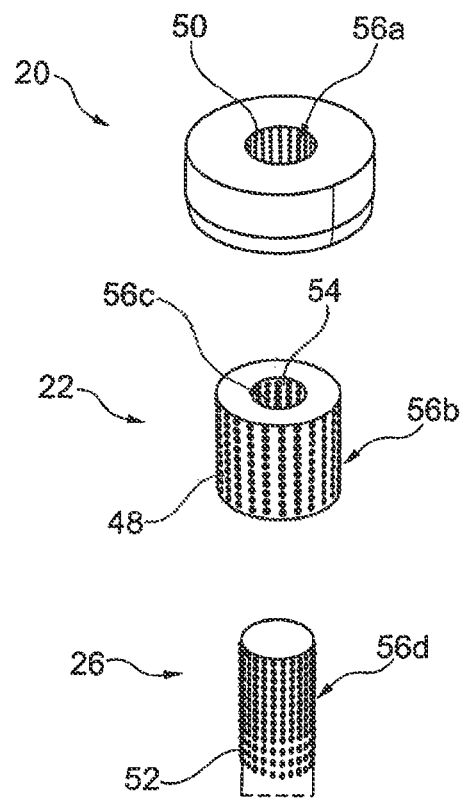
FIG. 20 shows a retaining ring, an insulation ring and an upper igniter-side end of a connection pin of a pole body of an igniter according to the invention before manufacturing of the igniter is started in a method according to the invention, in a schematic perspective view, comprising a texture according to a third variant.
Figure 21:
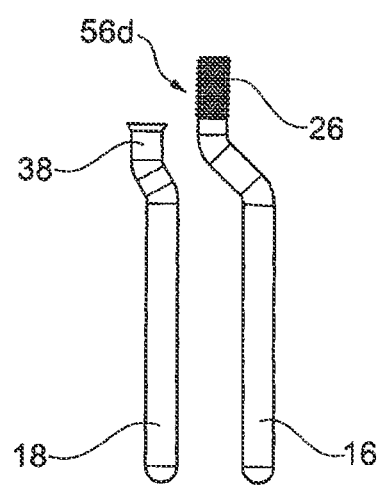
FIG. 21 shows the two connection pins of the pole body according to FIG. 20.
Figure 22:
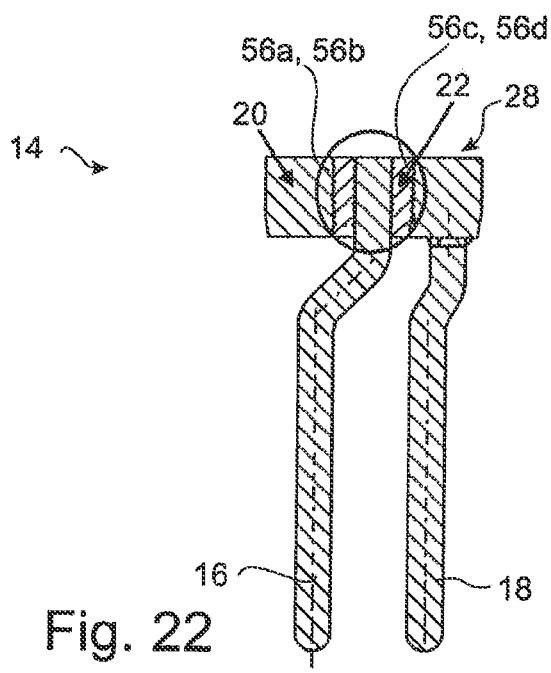
FIGS. 22 to 24 show different schematic sectional views of the pole body manufactured out of the components of FIGS. 20 and 21.
Figure 23:
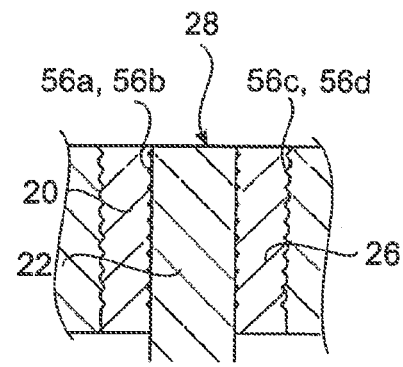
Figure 24:
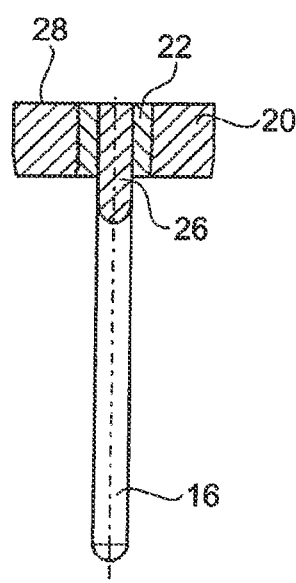
Figure 25:
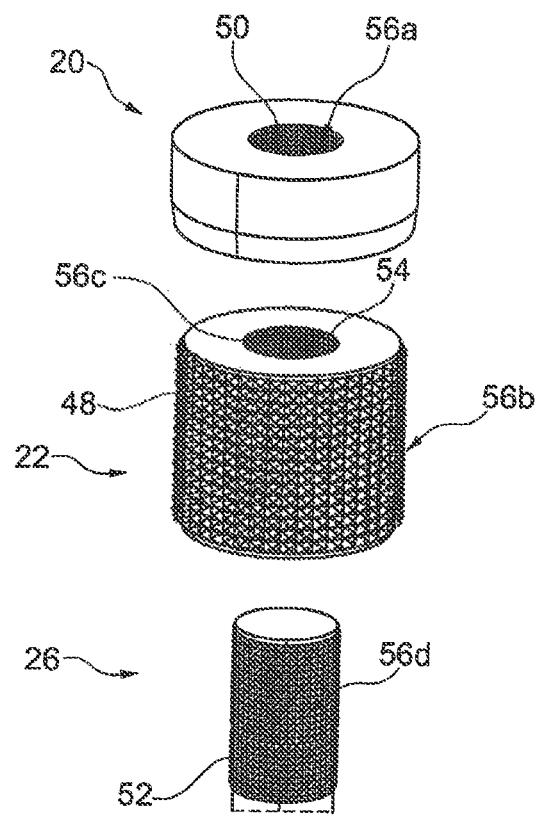
FIG. 25 shows a retaining ring, an insulation ring and an upper igniter-side end of a connection pin of a pole body of an igniter according to the invention before manufacturing of the igniter is started in a method according to the invention, in a schematic perspective view, comprising a texture according to a fourth variant.
Figure 26:
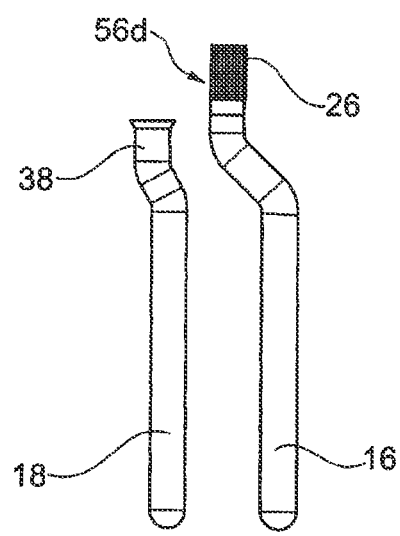
FIG. 26 shows the two connection pins of the pole body according to FIG. 25.
Figure 27:
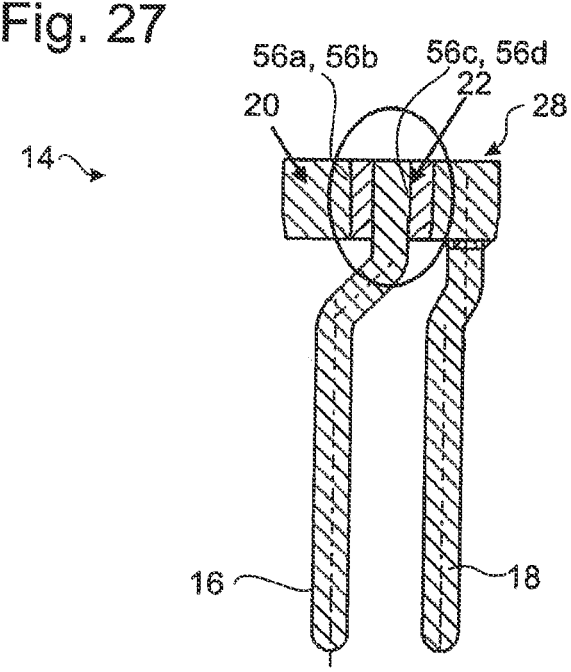
FIGS. 27 to 29 show different schematic sectional views of the pole body manufactured out of the components of FIGS. 25 and 26.
Figure 28:
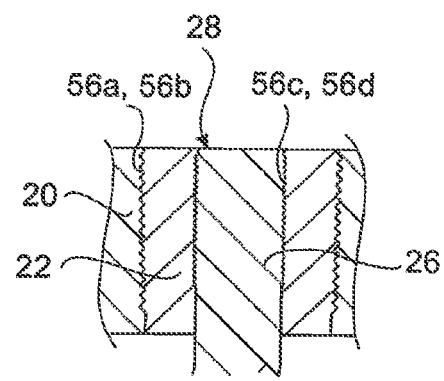
Figure 29:
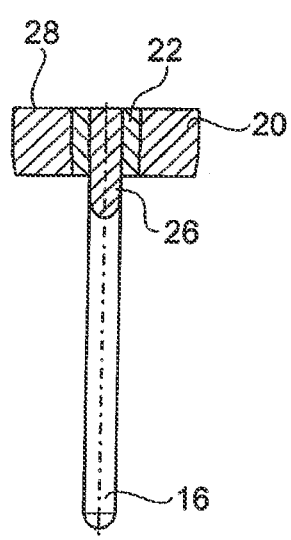
Figure 30:
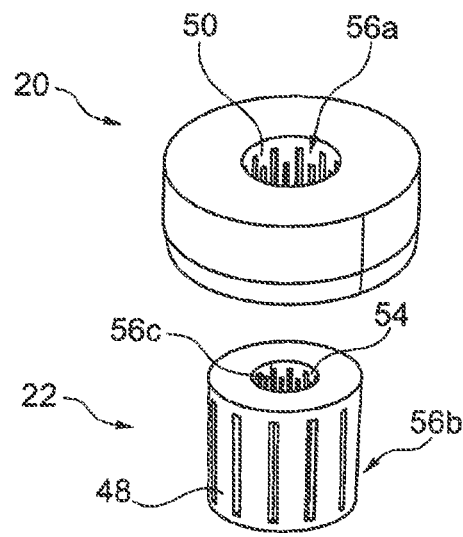
FIG. 30 shows a retaining ring, an insulation ring and an upper igniter-side end of a connection pin of a pole body of an igniter according to the invention before manufacturing of the igniter is started in a method according to the invention, in a schematic perspective view, comprising a texture according to a fifth variant.
Figure 31:
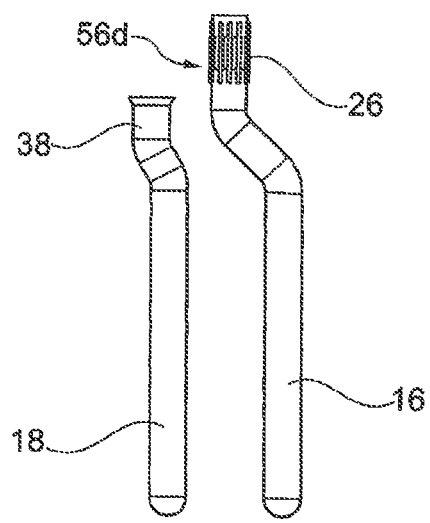
FIG. 31 shows the two connection pins of the pole body according to FIG. 30.
Figure 32:
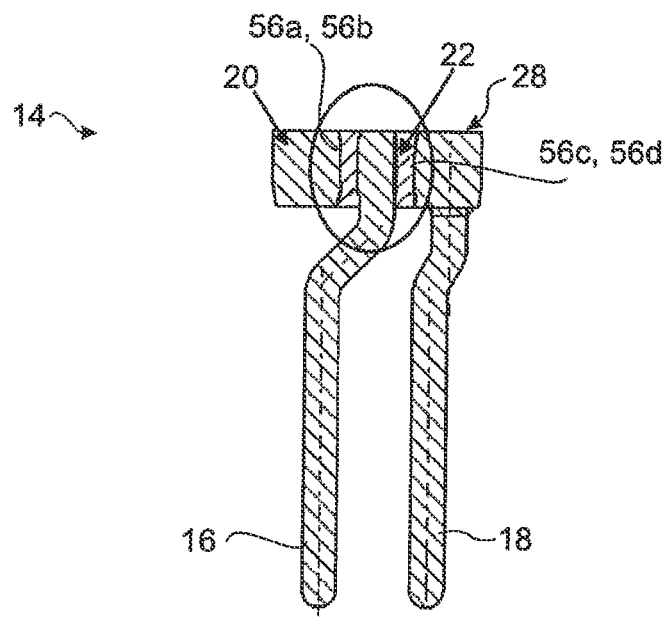
FIGS. 32 to 34 show different schematic sectional views of the pole body manufactured out of the components of FIGS. 30 and 31.
Figure 33:
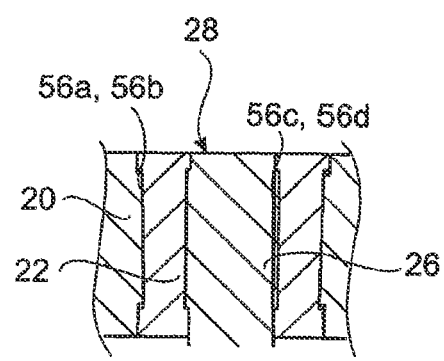
Figure 34:
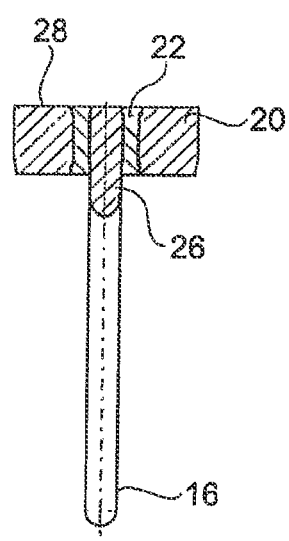
Figure 35:
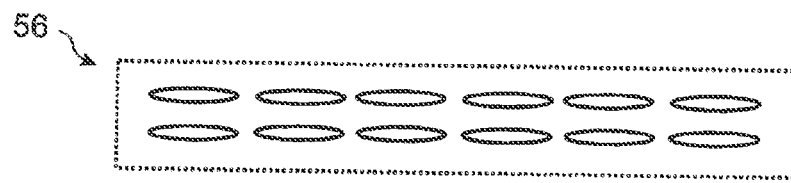
FIGS. 35 to 44 show schematic views of further variants for a texture of the retaining ring, the insulation ring and/or the connection pin.
Figure 36:
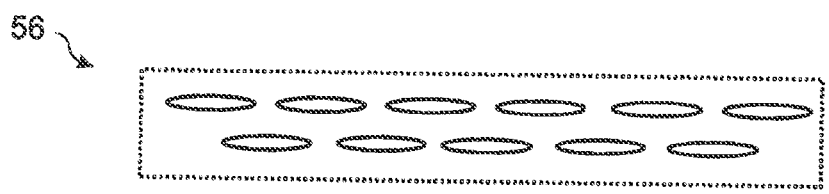
Figure 37:
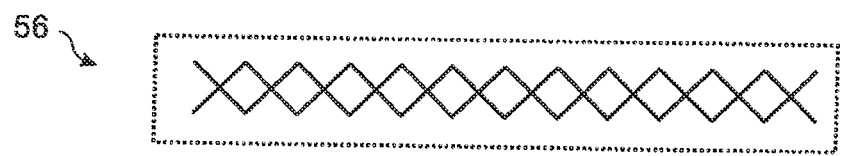
Figure 38:
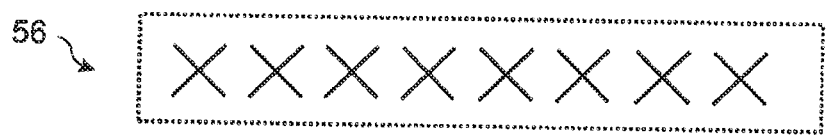
Figure 39:
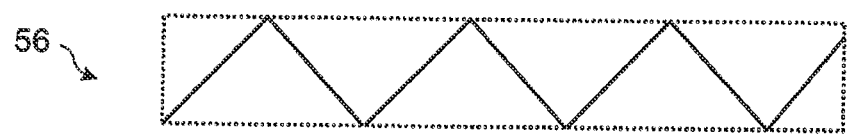
Figure 40:
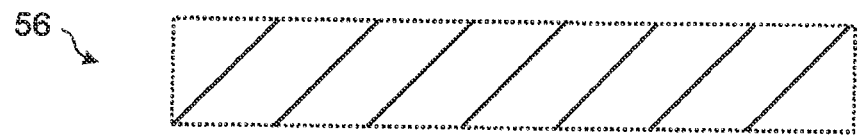
Figure 41:
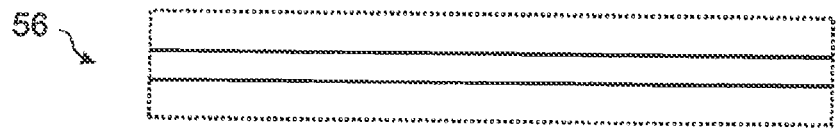
Figure 42:
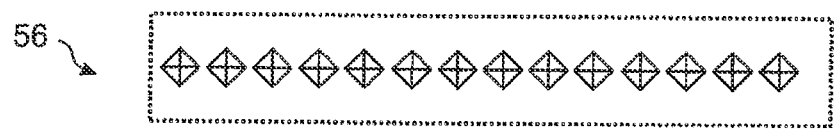
Figure 43:
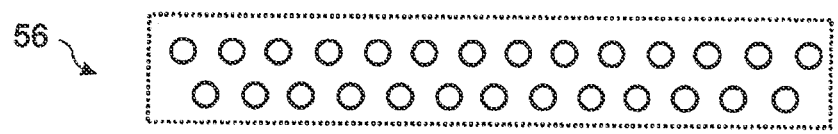
Figure 44:
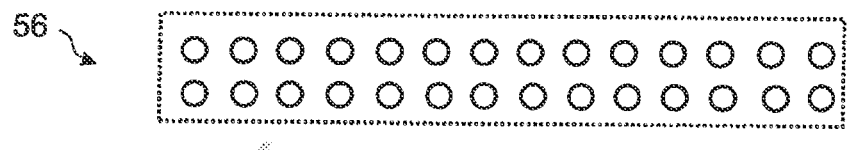
Figure 45:
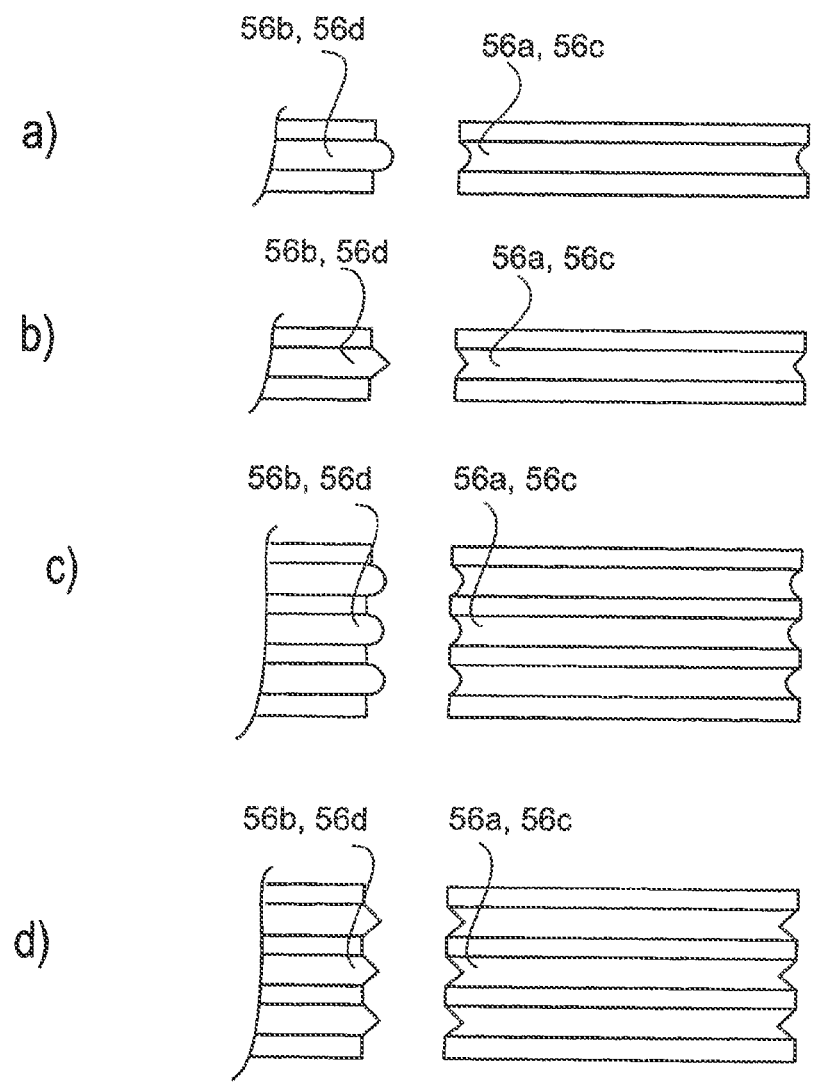
FIGS. 45a to 45d show variants for textures of the retaining ring and the insulation ring and, resp., of the insulation ring and the connection pin.

FIG. 12 shows an enlarged cutout from FIG. 11. FIG. 14 illustrates the cutting direction of the FIGS. 11 and 13.

Analogously to the afore-described embodiment, the FIGS. 15 to 19 show a pole body 14 having a differently configured texture 56a, 56b, 56c, 56d.

In this case, the texture is formed by semi-spherical recesses and projections facing each other. In this case, too, the texture 56a, 56b between the retaining ring 20 and the insulation ring 22 is selected to be equal to the texture 56c, 56d between the insulation ring 22 and the connection pin 16.

The FIGS. 20 to 24 show another variant of the texture 56a, 56b, 56c, 56d. In this example, the arrangement of the recesses and the projections is reversed and is formed to be complementarily inverse compared to the last-described example.

Whereas, in the just described example, the recesses were provided at the surfaces 50 and 52, here the recesses are formed at the surfaces 48 and 54.

For the method according to the invention, the assignment of the respective textures 56a, 56b, 56c, 56d to the surfaces 48, 50, 52, 54 as well as the exact shape of each of the selected structures is of minor importance.

The example of the textures 56a, 56b, 56c, 56d shown in FIGS. 25 to 29 represents a knurled structure configured on all of the four surfaces 48, 50, 52, 54.

Finally, the FIGS. 30 to 34 show a texture in the form of ribs of the textures 56b, 56c extending in the axial direction a and projecting in the radial direction r and of corresponding recesses 56a, 56d.

As shown here, several of the structures may only be configured in the metal parts of the retaining ring 20 and of the connection pin 16 and may be missing in the insulation ring 22. In this case, the complementary textures then are formed as late as in the course of the compression step, when the material of the retaining ring 20 and, resp., of the connection pin 16 digs into the insulation ring 22 by the pressing force.

The FIGS. 35 to 44 illustrate further examples of textures which, for reasons of clarity, are denoted merely with the reference numeral 56 and each of which may be formed as a recess or a raised structure on the individual surfaces 48, 50, 52, 54.

All of the different textures 56 optionally can be exchanged for one another at the discretion of those skilled in the art, as a matter of course. Similarly, other appropriate structuring patterns may be employed.

In general, the individual components of the textures 56 may merge or may be delimited against one another and may especially be dot-shaped or line-shaped.

In the FIGS. 45a to 45d, it is once again illustrated in which way the textures 56a, 56b and, resp., 56c, 56d of the surfaces 48, 50 and, resp., 52, 54 are configured with complementary projections and recesses so that after the compression step they engage free from play.

It is also imaginable to manufacture the insulation ring 22 in an injection-molding or casting process from a suitable plastic material by filling said plastic material into a clearance between the inner peripheral surface 50 of the retaining ring 20 and the outer peripheral surface 52 of the end 26 of the connection pin 16. In this case, the injection or casting step would replace the compression step.

Of course, in all illustrated examples, instead of an insulation ring 22 having only one through-opening 39b for the igniter-side end 26 of the connection pin 16, an insulation ring 22' having two through-openings 39b can be used so that also the igniter-side end 38 of the connection pin 18 is passed through the insulation ring 22'.

After having completed the pole body 14, 14' and having mounted the conductive element 24, the first cap 31 and the second cap 30 are attached to the upper side 28 of the pole body 14, and the subassembly formed in this way is provided with the fastening portion 34 by casting or injection-molding in a separate working step to complete the igniter 10.

In the FIGS. 46 to 48a, another production method according to the invention for an igniter according to the invention is illustrated. In this case, the igniter according to the invention substantially corresponds to the igniter shown in FIG. 1a, wherein here one or else both connection pin(s) is/are configured to extend linearly along its/their entire longitudinal extension in the axial direction, however. In other words, advantageously in this case no curvature or bending along the longitudinal axis of the connection pin(s) is resulting.

The representations in the FIGS. 46 to 48a substantially correspond to those of the FIGS. 2 to 4a. The basic difference in this respect in FIGS. 46 to 48a consists in the fact that the connection pin 16 shown there is composed of two component parts, viz. a first contact portion 17a and a second contact portion 17b. Both contact portions 17a, 17b are linear, longitudinally extending components part made from metal. They are substantially cylindrical wire elements which are connected, especially welded, soldered or glued, to each other at a respective one of their end faces and are made from suitable metallic materials similar or equal to the integrally formed connection pin 16 described further above.

Figure 46:
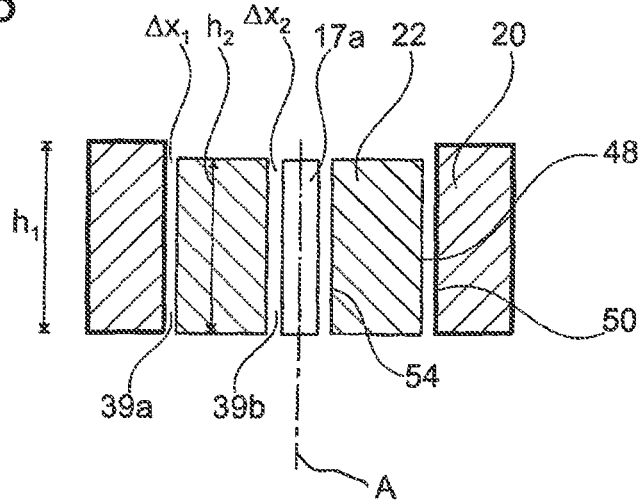
FIGS. 46 to 48 show steps of the production of an igniter according to the invention in accordance with a method according to the invention, as set forth in a further embodiment.

In the following, the description of the FIGS. 46 to 48a is restricted to the essential differences from the FIGS. 2 to 4a described further above. Thus, FIG. 46 shows a retaining ring 20, an insulation ring 22 and a first contact portion 17a with a longitudinal axis A as separate prefabricated component parts each of which can be produced per se independently of each other and can be made available for the production method of the igniter 10 according to the invention. In this case, too, these separate component parts are assigned to one another, as shown already in FIG. 2, in this case, however, the axial length of the one first contact portion 17a corresponding to the axial extension of the insulation ring 22 and, resp., to that of its through-opening 39a.

The three components of retaining ring 20, insulation ring 22 and first contact portion 17a are fitted into one another, as shown in FIG. 46. In this case, too, a projection of the retaining ring 20 is formed on the side of the igniter-side end 26 of the first contact portion 17a and, resp., the igniter-side upper side 28 of the retaining ring 20 protrudes from the igniter-side upper side of the insulation ring 22 and of the first contact portion 17a. On the opposite side, viz. on the igniter-side lower side of the retaining ring 20, the first contact portion 17a closes off with the retaining ring 20 in a substantially planar manner. In other words, no axial projection of the first contact portion 17a is formed at the igniter-side lower side of the retaining ring 20 in this case.

Figure 47:
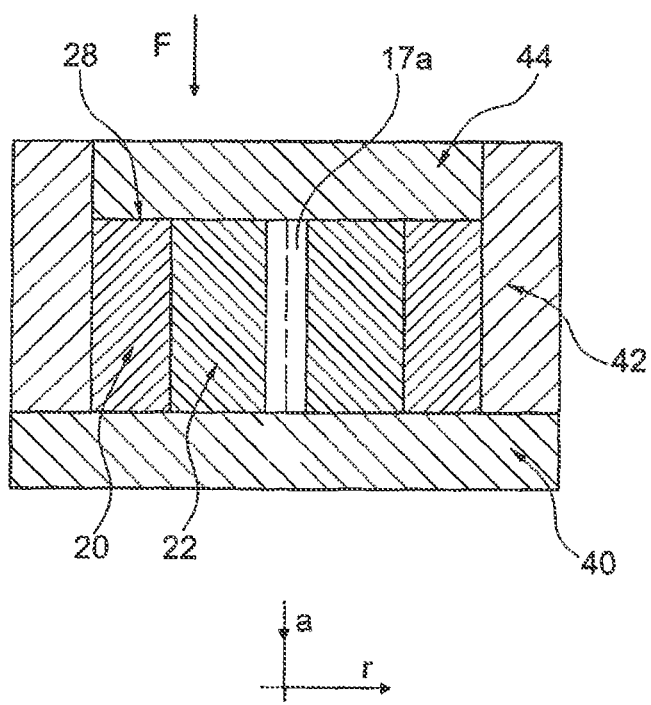

As shown in FIG. 47, the subassembly illustrated in FIG. 46 is put onto a support 40, is surrounded by a counter-holder 42, and a force F acting in the axial direction a is applied, by a compressing stamp 44 movable along the axial direction a, to the retaining ring 20, the insulation ring 22 and the respective end of the first contact portion 17a which, in the completed igniter, corresponds to the end 26 of the connection pin 16.

The representation in FIG. 47 also directly discloses a crucial advantage of the afore-described embodiment according to FIGS. 46 to 48a, i.e. that such manufacture, especially compressing and a compressing procedure by means of the compressing stamp 44, is substantially facilitated and is also more efficient than this is the case in an embodiment or a corresponding production of an igniter according to FIGS. 2 to 4a. As here (FIG. 47) the support 40 need not have any opening for receiving an axially projecting connection pin 16 (FIG. 3), a complicated positioning and fixation as it is the case for the axially projecting connection pin 16 (according to FIG. 3) is omitted.

After completing the compressing step or, resp., several compressing steps according to FIG. 47, the first contact portion 17a, the insulation ring 22 and the retaining ring 20 are connected to one another securely and free from play. The connection between the individual component parts is especially moisture-tight and airtight or, resp., gastight.

Figure 48:
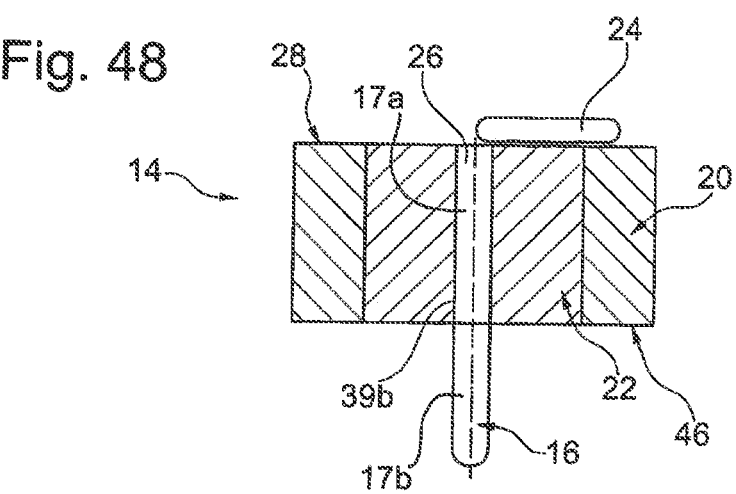

FIG. 48 illustrates a respective tightly connected subassembly of the retaining ring 20, the insulation ring 22 and the first contact portion 17a. However, only in this case, in a further manufacturing step, is a second contact portion 17b connected to the first contact portion 17a in an electrically conducting manner, substantially in axial alignment with the latter, to manufacture a first connection pin 16 comprising both contact portions 17a, 17b. Concretely speaking, the first contact portion 17a is linearly formed substantially in cylindrical shape and at its opposite ends comprises two end sides or end faces which are aligned substantially in parallel to each other and normal to the longitudinal axis A of the first contact portion 17*a*, one of said end faces already representing the igniter-side end 26 of the afterwards finished first connection pin 16. The second contact portion 17*b* is now connected and, resp., fastened to the end face of the first contact portion 17*a* opposed thereto. To this end, the second contact portion 17*b* includes an end face configured to be appropriately complementary, especially a planar surface equally aligned normal to the longitudinal axis of the second contact portion 17*b*, so that here a simple connection of the two contact portions 17*a*, 17*b* is possible by welding, soldering or gluing. The second contact portion 17*b* includes, at its end opposite thereto, a rounded dome-shaped contour which is adapted to receive a known plug (not shown) to be connected to a known control device (not shown). In short, the two contact portions 17*a*. 17*b* connected to each other in an electrically conducting manner form a first connection pin 16 as it is shown, for example, in FIG. 4 as an integral component part.

In addition, regarding FIG. 48, an igniter-side end 38 of a second connection pin 18 can be welded to the lower side 46 of the retaining ring in a similar or analogous manner, as described further above in the remarks on FIG. 4. This is not explicitly shown in FIG. 48 but the reference numeral 46 merely indicates a possible point on the lower side 46 of the retaining ring 20 to which the second connection pin 18 can be appropriately fastened.

Figure 48A:
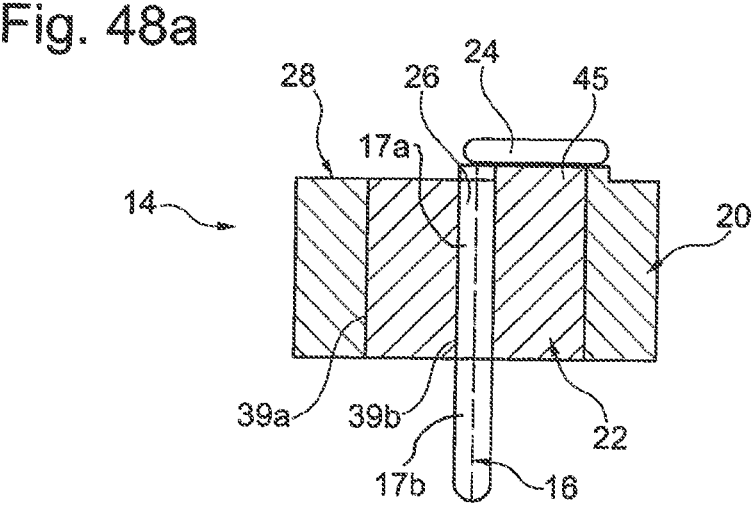
FIG. 48a shows a sectional view of an igniter according to the invention being produced in accordance with a method according to the invention, as set forth in a variant.

Further, regarding FIG. 48*a* it is also possible that the upper side 28 is provided with a raised structure 45, with the raised structure 45 being equally produced in the compression step or by plural compression steps carried out successively, especially by a compressing die 44 adapted to the contour of the raised structure 45.

The substantial advantage of an igniter as produced according to a method as set forth in the FIGS. 46 to 48*a* thus in other words consists in the fact that the required finished length of a connection pin has to be realized or produced as late as substantially at the end of the production process of the igniter. During the preceding production process, it is not necessary to handle a connection pin already finished with respect to its axial length. Advantageously, in this case instead of a finished connection pin a first contact portion can be handled which is optimally adapted to further component parts surrounding the same, especially with respect to its longitudinal extension so as to obtain more efficient and more favorable preceding production processes.

The invention claimed is:

1. An igniter for a gas generator, comprising a pole body having at least one connection pin, a prefabricated metal retaining ring and a prefabricated plastic insulation ring, wherein the insulation ring spaces the at least one connection pin apart from the retaining ring and electrically insulates it from the same, and wherein the insulation ring and retaining ring are secured to the at least one connection pin by a compression fit in which the retaining ring is compressed and deformed onto the insulation ring with the at least one connection pin installed therein and.

2. The igniter according to claim 1, wherein the igniter comprises a fastening portion made from plastic which is separate from the insulation ring and into which at least portions of the at least one connection pin are embedded.

3. He igniter according to claim 1, wherein an outer peripheral surface of the insulation ring and an inner peripheral surface of the retaining ring and/or an outer peripheral surface of the connection pin and an inner peripheral surface of the insulation ring have complementary textures.

4. The igniter according to claim 1, wherein the insulation ring includes a through-opening through which an igniter-side end of the connection pin extends.

5. The igniter according to claim 4, further comprising another connection pin that is fastened to the retaining ring in an electrically conducting manner.

6. The igniter according to claim 1, wherein the insulation ring includes two through-openings through which the igniter-side ends of two juxtaposed connection pins extend.

7. The igniter according to claim 1, wherein at least one connection pin is formed of two separate component parts, a first contact portion and a second contact portion, which are tightly connected to each other in an electrically conducting manner.

8. A method for producing an igniter for a gas generator comprising the steps of:
providing at least one connecting pin, a prefabricated metal retaining ring and a prefabricated plastic insulation ring,
fitting the connecting pin, the insulation ring and the retaining ring inside one another so that the connecting pin is surrounded by the insulation ring and the insulation ring is surrounded by the retaining ring, and
compressing the retaining ring, the insulation ring and the connection pin in a compression step in which the retaining ring, the insulation ring and the connecting pin are connected to one another securely and free from play while at least the retaining ring is deformed.

9. The method according to claim 8, wherein an outer peripheral surface of the insulation ring and an inner peripheral surface of the retaining ring have complementary textures, and in that before the compression step a distance between the insulation ring and the retaining ring is so large that the insulation ring and the retaining ring can be fitted inside each other without being deformed.

10. The method according to claim 9, wherein in the compression step the textures of the insulation ring and the retaining ring are nested in a gap-free, especially gastight, manner.

11. The method according to claim 8, wherein, before the compression step, an axial length of the retaining ring is larger than an axial length of the insulation ring, wherein especially the retaining ring and the insulation ring are axially aligned relative to each other so that the igniter-side upper side of the retaining ring projects from the igniter-side upper side of the insulation ring.

12. The method according to claim 8, wherein in the compression step a raised structure is produced on the igniter-side upper side of the pole body comprising the retaining ring, the insulation ring and the connection pin and, resp., the first contact portion.

13. The method according to claim 8, wherein the compression step is repeated several times.

14. The method according to claim 8, wherein the at least one connection pin comprises a single connection pin fitted within the insulation ring, through the compression step, the method further comprising the step of providing a second connection pin and fastening the second connection pin to the retaining ring in an electrically conducting manner.

15. The method according to claim 8, wherein an electrically conductive element is arranged between the connection pin and the retaining ring in an electrically conducting manner.

16. The method according to claim 15, wherein the electrically conductive element comprises a bridge wire that is welded or soldered, between the connection pin and the retaining ring.

17. The method according to claim 8, wherein a subassembly comprising two connection pins, the insulation ring and the retaining ring tightly connected due to the compressing of the retaining ring is surrounded by injection-molding or casting with a fastening portion made from a plastic into which at least portions of the connection pins are embedded.

18. The method according to claim 8, wherein in the compression step a force acting in the axial direction is applied to the retaining ring, the insulation ring and the connection pin.

19. The igniter according to claim 1, wherein the at least one connection pin comprises a single connection pin fitted within the insulation ring and compression ring, the igniter further comprising a second connection pin welded or soldered to the retaining ring in an electrically conducting manner.

20. A method for producing an igniter for a gas generator, comprising the steps of:

providing at least a first contact portion, at least a second contact portion, a prefabricated metal retaining ring and a prefabricated plastic insulation ring, fitting the first contact portion the insulation ring and the retaining ring inside one another so that the first contact portion is surrounded by the insulation ring and the insulation ring is surrounded by the retaining ring, compressing the retaining ring, the insulation ring and the first contact portion in a compression step in which the retaining ring, the insulation ring and the first contact portion are connected to one another securely and free from play while at least the retaining ring is deformed, wherein especially in the compression step a force acting in the axial direction is applied to the retaining ring, the insulation ring and the first contact portion, and connecting the second contact portion in an electrically conducting manner to the first contact portion, substantially in axial alignment, by welding, soldering or gluing, to form at least one connection pin from the first and second contact portions.

\* \* \* \* \*